United States Patent
Van Gerwen et al.

(10) Patent No.: US 10,238,122 B2
(45) Date of Patent: Mar. 26, 2019

(54) FOOD FORMING DRUM

(71) Applicant: GEA Food Solutions Bakel B.V., EN Bakel (NL)

(72) Inventors: Hendrikus Petrus Gerardus Van Gerwen, Someren (NL); Petrus Hubertus Maria Schoenmakers, JG Gennep (NL); Andreas Leonardus De Bijl, La Den Dungen (NL)

(73) Assignee: GEA FOOD SOLUTIONS BAKEL, B.V., Bakel (NL)

( * ) Notice: Subject to any disclaimer, the term of this patent is extended or adjusted under 35 U.S.C. 154(b) by 83 days.

(21) Appl. No.: 15/304,949

(22) PCT Filed: May 5, 2015

(86) PCT No.: PCT/EP2015/059877
§ 371 (c)(1),
(2) Date: Oct. 18, 2016

(87) PCT Pub. No.: WO2015/169812
PCT Pub. Date: Nov. 12, 2015

(65) Prior Publication Data
US 2017/0142987 A1    May 25, 2017

(30) Foreign Application Priority Data

May 9, 2014 (EP) ..................................... 14167687
Jun. 12, 2014 (EP) ..................................... 14172120
Dec. 19, 2014 (EP) ..................................... 14199457

(51) Int. Cl.
*A21C 3/02* (2006.01)
*A23P 10/28* (2016.01)
(Continued)

(52) U.S. Cl.
CPC ............ *A22C 7/0069* (2013.01); *A21C 3/028* (2013.01); *A23P 30/10* (2016.08); *A23P 10/28* (2016.08)

(58) Field of Classification Search
CPC ......... A21C 3/028; A21C 11/04; A21C 11/08; A21C 11/22; A21C 7/005; A23P 10/20;
(Continued)

(56) References Cited

U.S. PATENT DOCUMENTS 2,887,964 A * 5/1959 Griner .................... A21C 11/04
                                                      425/289
4,276,800 A * 7/1981 Koppa ................... A21C 11/04
                                                      425/289
(Continued)

FOREIGN PATENT DOCUMENTS

EP         2253219 A2    11/2010
WO    2004/002229 A2     1/2004
(Continued)

OTHER PUBLICATIONS

Extended European Search Report for European Application No. 17177897 dated Jul. 20, 2017.
(Continued)

*Primary Examiner* — Jason L Vaughan
(74) *Attorney, Agent, or Firm* — The Dobrusin Law firm, P.C.

(57) ABSTRACT

The invention relates to the design of a food forming drum (2) which will be used for molding food in shaped products. The application field wherein the drum will operate is the field of human consumption and pet food and reaches from meat products (poultry, pork, beef, etc), meat replacement products, fish, dairy to potatoes and vegetables products. Particularly, the present invention relates to a food forming drum comprising an inner member (24) with an inner
(Continued)

cylinder (16) and a multitude of ribs (17) extending in radial direction from the inner cylinder and with at least one porous member, made from a porous material with interconnecting pores, connected to the ribs and wherein a multitude of rows with product cavities, each row comprising one or a multitude of product cavities, are provided in the porous member(s). The present invention further relates to a method to produce such drums.

21 Claims, 22 Drawing Sheets

(51) Int. Cl.
*A22C 7/00* (2006.01)
*A23P 30/10* (2016.01)

(58) Field of Classification Search
CPC .......... A23P 10/22; A23P 10/28; A23P 30/10; A22C 7/0069
USPC ........................................ 492/38, 39, 47, 60
See application file for complete search history.

(56) References Cited

U.S. PATENT DOCUMENTS

| | | | |
|---|---|---|---|
| 7,819,650 B2* | 10/2010 | Meskendahl | A22C 7/0038 425/230 |
| 8,622,729 B2* | 1/2014 | Suski | A21C 11/04 425/235 |
| 8,622,730 B2* | 1/2014 | Suski | A21C 5/003 425/235 |
| 8,747,934 B2* | 6/2014 | Meskendahl | A22C 7/0038 |
| 9,028,239 B2* | 5/2015 | Van Gerwen | A22C 7/0092 264/299 |
| 9,044,025 B2* | 6/2015 | Bakhoum | A21C 11/08 |
| 9,844,889 B1* | 12/2017 | Budek | B26D 7/18 |
| 10,028,515 B2* | 7/2018 | Boom | A22C 7/0069 |
| 2005/0220932 A1 | 10/2005 | Van Der Eerden et al. | |
| 2010/0159095 A1* | 6/2010 | Suski | A21C 11/04 426/383 |
| 2013/0337128 A1 | 12/2013 | Van Gerwen et al. | |
| 2015/0282520 A1 | 10/2015 | Meskendahl et al. | |

FOREIGN PATENT DOCUMENTS

| | | |
|---|---|---|
| WO | 2004/002229 A3 | 5/2004 |
| WO | 2012107236 A2 | 8/2012 |
| WO | 2012/107236 A3 | 11/2012 |

OTHER PUBLICATIONS

International Preliminary Report on Patentability for International Application No. PCT/EP2015/059877, dated Oct. 13, 2016.
International Search Report and Written Opinion for International Application No. PCT/EP2015/059877, dated Aug. 20, 2015.

\* cited by examiner

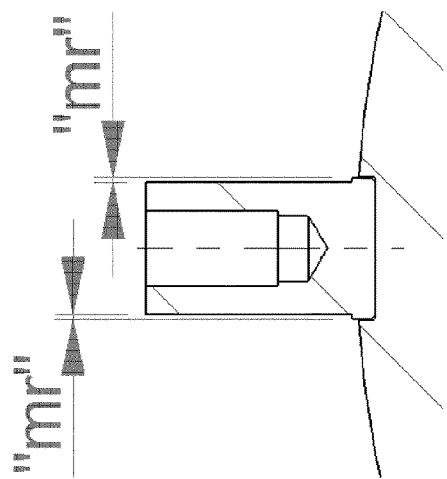
Figure 9b-III
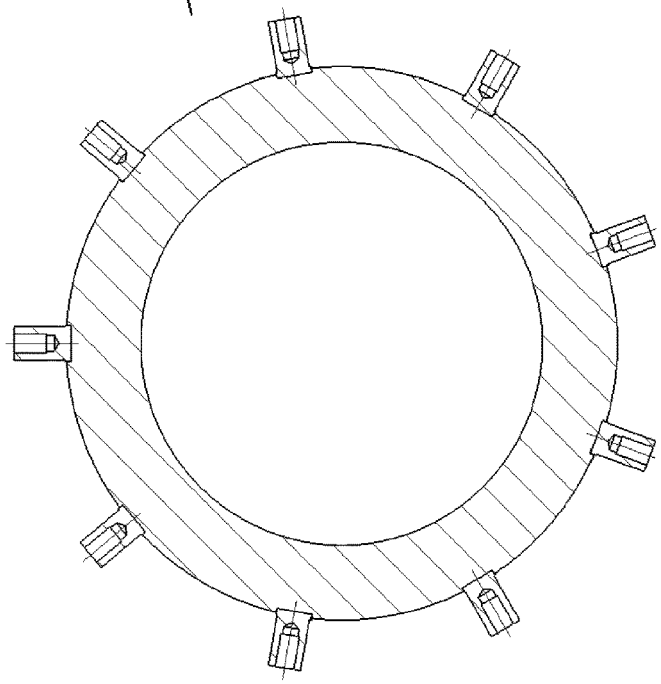
Figure 9b-II
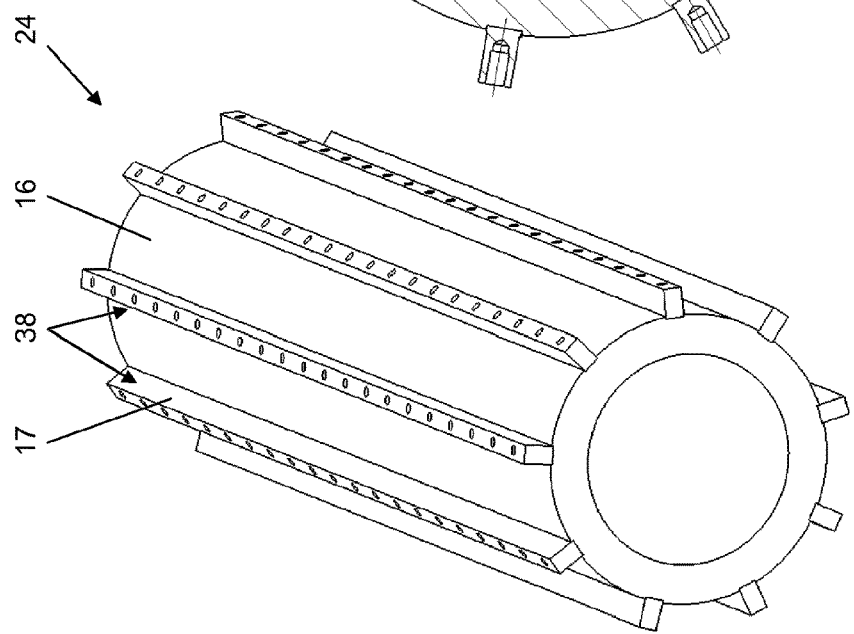
Figure 9b-I

Figure 9d-I

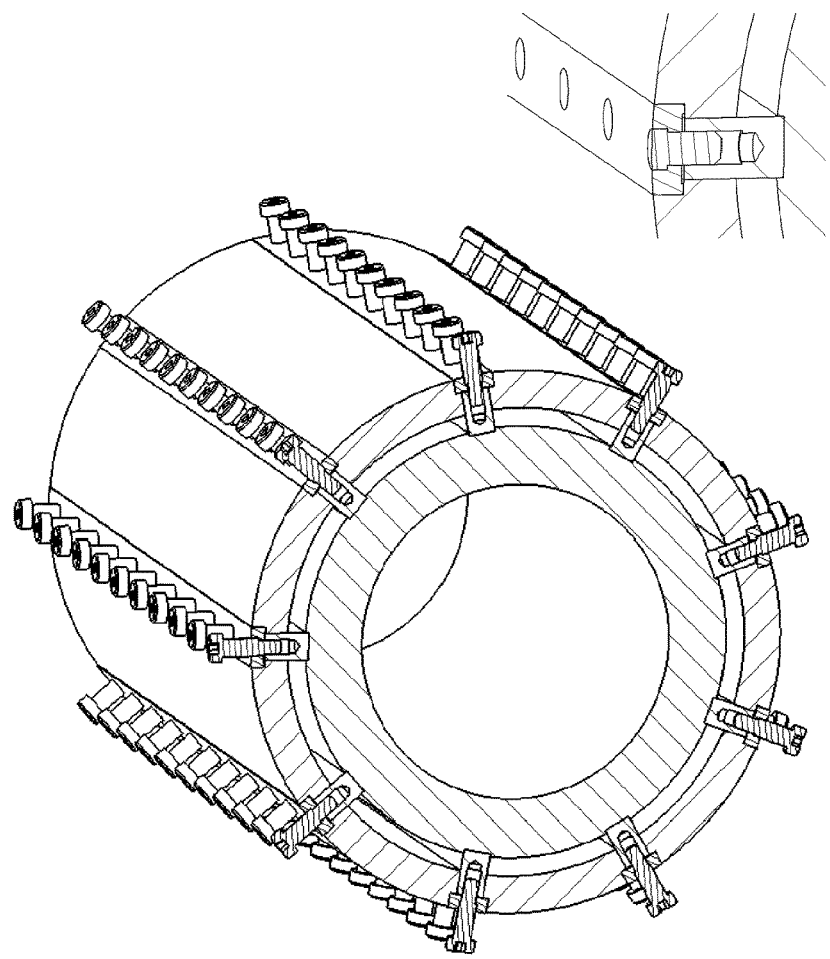
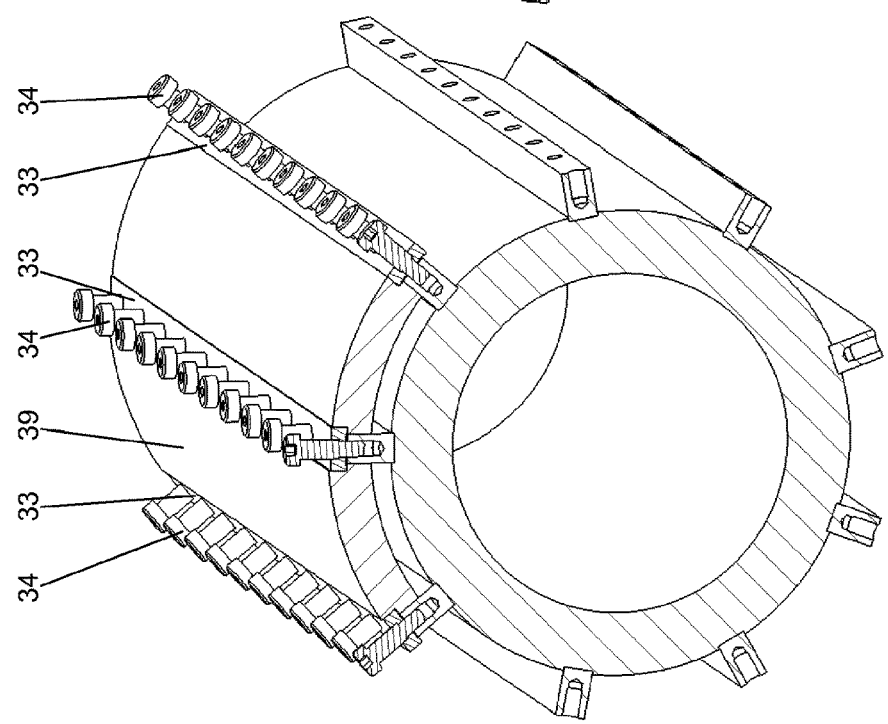

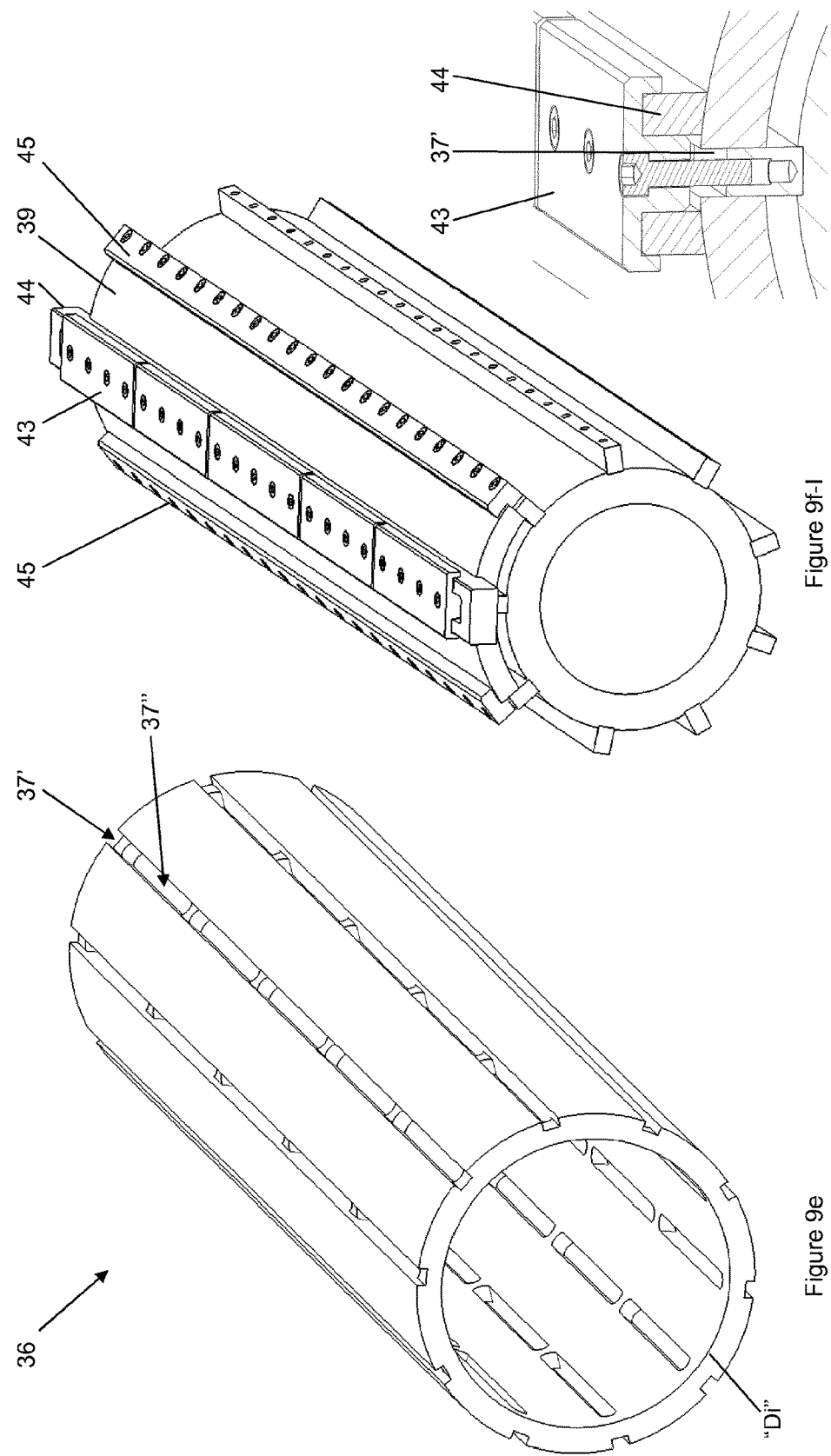

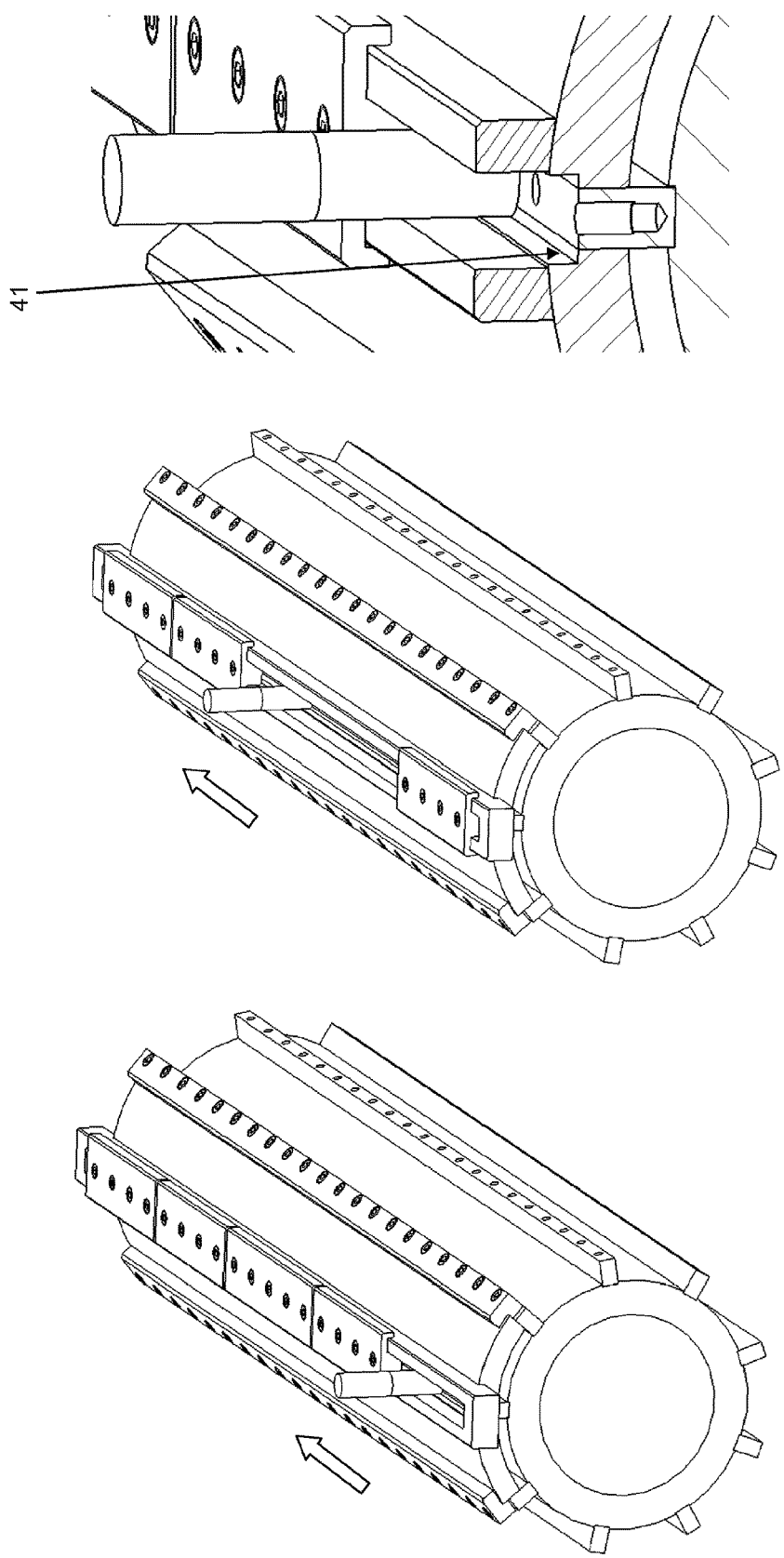

FOOD FORMING DRUM

The invention relates to the design of a food forming drum which will be used for moulding food in shaped products. The application field wherein the drum will operate is the field of human consumption and pet food and reaches from meat products (poultry, pork, beef, etc), meat replacement products, fish, dairy to potatoes and vegetables products. Particularly, the present invention relates to a food forming drum comprising an inner member with an inner cylinder and a multitude of ribs extending in radial direction from the inner cylinder and with at least one porous member, made from a porous material with interconnecting pores, connected to the ribs and wherein a multitude of rows with product cavities, each row comprising one or a multitude of product cavities, are provided in the porous member(s). The present invention further relates to a method to produce such drums.

Food forming drums are frequently used to form food products. It is therefore the objective of the present invention to continuously improve these drum regarding production hygiene and/or availability.

This objective is solved with a food forming drum comprising an inner member with an inner cylinder and a multitude of ribs extending in radial direction from the inner cylinder and with at least one porous member, made from a porous material with interconnecting pores, connected to the ribs and wherein a multitude of rows product cavities, each row comprising one or a multitude of product cavities, are provided in the porous member(s), wherein the porous member extends radially above the radial extension of the rib(s).

The disclosure regarding this embodiment of the present invention also applies to the other embodiments and vice versa. Subject matter from this embodiment can be combined with other embodiments and vice versa.

The present invention relates to a food forming drum, which is part of a food forming apparatus. This food forming drum has at its outer surface a multitude of product cavities, which are open towards the circumference of the drum and in which the food mass is formed into a food product, for example a patty. This food forming drum comprises, according to the present invention, a multitude of rows of product cavities, whereas each row comprises one or a multitude of product cavities, side by side. The rows are arranged in parallel to the middle axis of the inventive drum. During production, the drum turns and in one position the product cavities in one row are filled with the food mass and in a downstream position, the formed food mass is discharged from the product cavities, located in one row. Subsequently, the product cavities in one row of cavities can be filled again and so on. In order to vent the product cavities during their filling and/or in order to support the discharge of the product, the product cavities are at least partially, preferably entirely made of a porous material, for example sintered metal and/or plastic, which is gas-permeable and via which the product cavity can be vented or through which gas, for example air, can be discharged, to loosen the formed product from the surface of the product cavity. Preferably, the porous material comprises pores/channels, which are interconnected to each other.

The food forming drum further preferably comprises fluid channels, which extend in the longitudinal direction of the drum, i.e. parallel to the center axis of the drum and extend preferably from one end to the other end of the drum. Via each fluid channel, ventilation air can be discharged, for example to the ambient, and/or compressed gas can be forced into the cavities to discharge the formed product. Additionally, a cleaning fluid can be forced through the channels and/or the porous material of the product cavities. Each channel is confined by a cylindrical inner member, two ribs extending radially from the inner member and a porous member provided as a cylinder or a segment of a cylinder.

The at least partially porous product cavities are provided as one or more porous members, wherein the cavities are recesses in the porous material. The porous members are preferably a cylinder or cylinder segments. The porous member(s) can extend entirely around an inner drum or can be inserts, which are inserted between two ribs, which are part of the inner member and then fixed to the inner member with a preferably drum-like structure. Each segment may comprise one or more rows of cavities.

The porous member is part of a mould drum, which will be used for moulding products, e.g. patties, from a mass of food material, for example meat, which mass will be delivered by a mass supply system. The drum comprises one or more rows with one or more cavities where a product cavity wall having at least partially a porous structure. A movable unit will be used to loading/unloading the mould drum easily from the forming apparatus and/or a cleaning apparatus and/or a storage unit and to move the mould drum between the forming apparatus and/or cleaning apparatus and/or a storage unit.

According this embodiment of the present invention, the porous member extends radially above the radial extension of the ribs. Hence, even after machining the drum to its final outer diameter and even after closing the pores at the outer circumference of the drum, a layer of porous material remains which is permeable for a fluid, either air or a cleaning fluid. Thus, dead corners, which are not assessable for a cleaning fluid, are excluded and or fractures of the porous material in the vicinity of the ribs are at least reduced.

According to another inventive or preferred embodiment of the present invention, the width of the cross-section of each rib is reduced at its tip.

The disclosure regarding this embodiment of the present invention also applies to the other embodiments and vice versa. Subject matter from this embodiment can be combined with other embodiments and vice versa.

The width of the rib is its extension in the circumferential direction of the drum. The reduced width at the tip of the rib does not reduce its stiffness but improves the mechanical stability of the porous member. The tip of the rib can, for example, be V-shaped, rounded and/or trapeze-shaped.

According to another inventive or preferred embodiment of the present invention each rib of the inner member of the food forming drum comprises at least one recess, preferably filled with porous material.

The disclosure regarding this embodiment of the present invention also applies to the other embodiments and vice versa. Subject matter from this embodiment can be combined with other embodiments and vice versa.

The recess extends over the entire width of the rib. Via the recess a fluid flow from one row of cavities to an adjacent row can be utilized during discharge of the products and/or during cleaning of the drum. The recess improves the connection between the rib and the porous member.

Each rib preferably comprises a multitude of recesses, provided more preferably equidistant and even more preferably each recess in the middle of two cavities. The recesses can be provided entirely within the rib and/or at the tip of the rib.

Preferably, a liquid flows through the recess during discharge of the formed products and/or during cleaning.

Each recess is preferably at least partially filled with powder prior to sintering.

In a preferred embodiment, the recess is shaped such that it guides the liquid to and/or from the outer surface of the porous member. Preferably, the recess is not straight over its length, but for example bent, curved or flexed, for example V-shaped.

According to another inventive or preferred embodiment of the present invention the food forming drum comprises at least one end cap, which is material bonded, preferably welded, or mechanically connected to the inner cylinder and/or the rib(s).

The disclosure regarding this embodiment of the present invention also applies to the other embodiments and vice versa. Subject matter from this embodiment can be combined with other embodiments and vice versa.

The connection of the cap(s) to the inner cylinder and/or the ribs improves the stiffness of the drum.

Preferably, one end cap comprises openings for filling the inner member with sintering powder. This allows the connection of the end caps prior to sintering the porous members. Material can be provided via the openings and/or pressure can be exerted on the powder during sintering.

Another preferred or inventive embodiment of the present invention is a food forming drum wherein it comprises mean to connect the porous member(s) to the inner cylinder and/or the rib, wherein the means extends radially to the outer surface of the porous member(s).

The disclosure regarding this embodiment of the present invention also applies to the other embodiments and vice versa. Subject matter from this embodiment can be combined with other embodiments and vice versa.

According to this embodiment of the present invention, the means extend radially to the outer surface of the porous member. Preferably, they are levelled with the other circumference of the porous member. Preferably, initially the means extend above the outer circumference of the porous member and are subsequently machined downwards until their tip is on a level with the outer circumference of the porous member preferably after the pores at the outer circumference of the porous member have been closed.

In a preferred embodiment, the means is a strip, made from metal or plastic or the like. The strip is provided parallel to the ribs. Preferably the strip extends over the entire axial length of the drum.

Preferably, the strip has a cross section with at least one sloped sidewall. Preferably, the width of the cross section of the strip increases in radial direction of the inventive drum.

Another preferred or inventive embodiment of the present invention is a food forming drum which comprises at least one clamping means which clamp the porous member(s) against the ribs.

The disclosure regarding this embodiment of the present invention also applies to the other embodiments and vice versa. Subject matter from this embodiment can be combined with other embodiments and vice versa.

Preferably, the clamping means is wedge-shaped and inserted and moved from one, preferably both ends of the drum between the inner member and/or the rib and the porous member. By moving the means from an end towards the middle of the inventive drum, the porous member is moved radially away from the centre of the drum. The clamping means can comprise several wedge shaped means, for example with different slops.

This embodiment is particularly suitable for a porous members provided as segments.

Another preferred or inventive embodiment of the present invention is a food forming drum, wherein the porous member is an insert, provided with chamfered fixing means.

The disclosure regarding this embodiment of the present invention also applies to the other embodiments and vice versa. Subject matter from this embodiment can be combined with other embodiments and vice versa.

The chamfered fixing means are preferably provided at two opposite surfaces which are adjacent to a rib, respectively. More preferably, the fixing means cooperate with the clamping means described above.

Yet another embodiment of the present invention is a method to produce the inventive food forming drum, wherein the porous member is secured to the inner member by means which are subsequently partially cut off.

The disclosure regarding this embodiment of the present invention also applies to the other embodiments and vice versa. Subject matter from this embodiment can be combined with other embodiments and vice versa.

According to a preferred embodiment, the means is a screw, which secures the porous member at the inner member. After the screw has been tensioned, its head is machined down until it is level with the outer circumference of the porous member.

The means can also be a strip, which is machined down after its fixation to the inner member.

Yet another preferred or inventive embodiment of the present invention is a method to produce the inventive food forming drum, wherein the machining and/or deep rolling of the porous member is carried out without the use of cooling and/or lubrication liquids.

The disclosure regarding this embodiment of the present invention also applies to the other embodiments and vice versa. Subject matter from this embodiment can be combined with other embodiments and vice versa.

Yet another preferred or inventive embodiment of the present invention is a method to produce the inventive food forming drum, wherein a recesses are provided into a porous tube before it is cut into segments.

The disclosure regarding this embodiment of the present invention also applies to the other embodiments and vice versa. Subject matter from this embodiment can be combined with other embodiments and vice versa.

Yet another preferred or inventive embodiment of the present invention is a method to produce the inventive food forming drum, wherein an insert is placed between two ribs and secured to the inner member by a retaining strip and fastening means.

The disclosure regarding this embodiment of the present invention also applies to the other embodiments and vice versa. Subject matter from this embodiment can be combined with other embodiments and vice versa.

Yet another preferred or inventive embodiment of the present invention is a method to produce the inventive food forming drum, wherein recesses are machined into an insert after it has been positioned on the inner member.

Yet another preferred or inventive embodiment of the present invention is a method to produce the inventive food forming drum, wherein inserts are slid between two ribs and then at least locally lifted until they are in contact with a projection at the rib.

Yet another preferred or inventive embodiment of the present invention is a method to produce the inventive food forming drum, wherein recesses are machined into an insert after it has been positioned on the inner member.

The inventions are now explained according to the figures. The explanations apply to all inventions likewise. The explanations do not limit the scope of protection.

Figure 1:
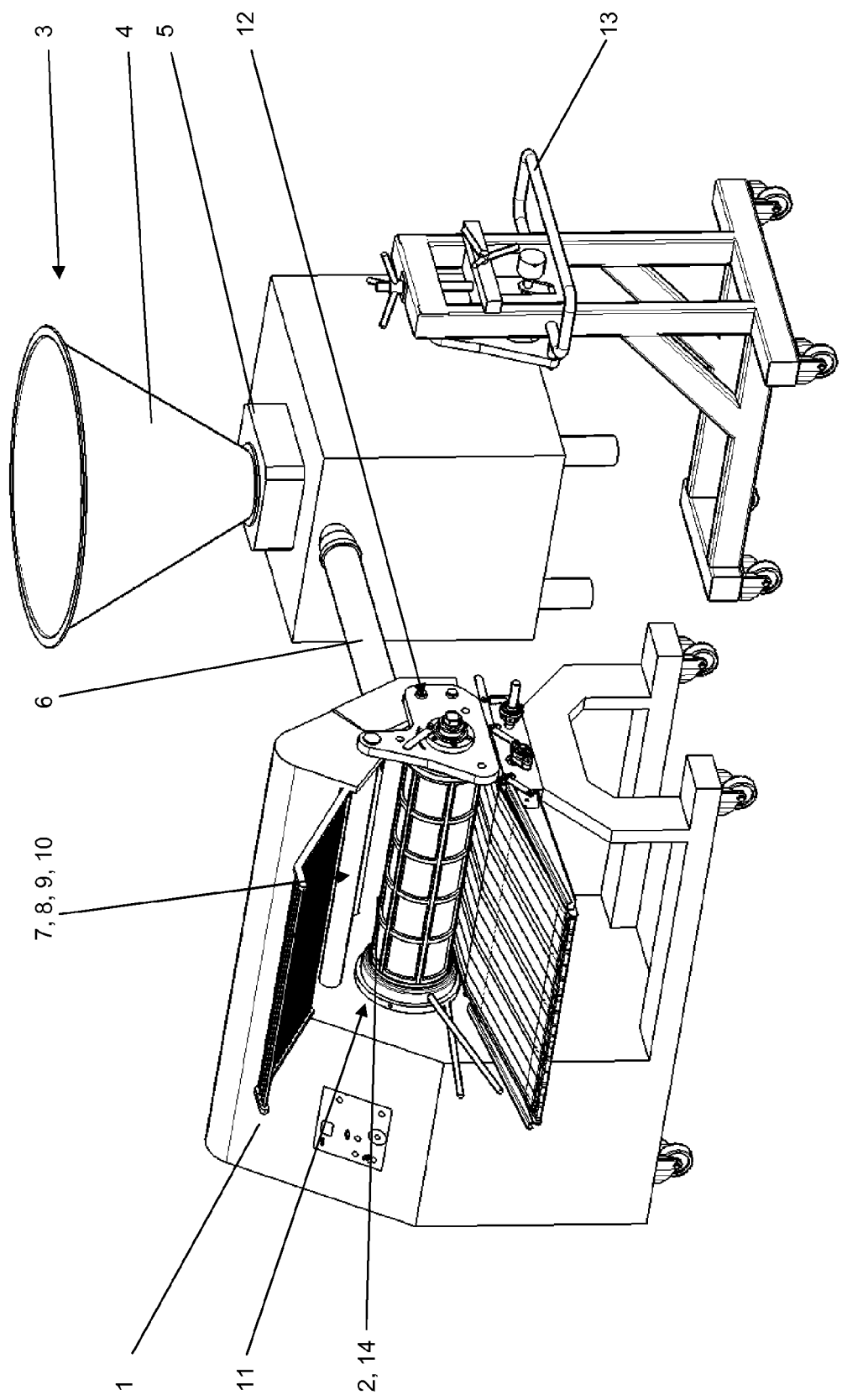
FIG. 1 shows a food forming apparatus.

FIG. 1 shows a food forming system wherein the inventive mould member 2 provided with mould cavities 14 is used. The mould member is here a mould drum 2 with a multitude of rows of cavities, wherein in the present case each row of cavities comprises five cavities which will be filled and from which formed products will be discharged simultaneously. The drum rotates, preferably continuously, during production of formed products. This system basically comprises a mass supply system 3 which is connected via mass transport means 6 to a food forming apparatus 1. The mass supply system comprises mainly a hopper 4 and a pump system 5. The food forming apparatus comprises mainly the divider 7, which distributes the food mass over the entire axial length of the mould member 2, a mould member 2 and a food feed member 8 which comprises a feed channel 9 and sealing means 10 to reduce/prevent leakage of food mass to the ambient. WO 2013/014010 shows several embodiments of a food forming apparatus with a food feed member. This document is hereby included by reference and hence part of the disclosure of the present application. During production the mass will be pumped via divider 7 into feed channel 9 and from thereon into the mould cavities 14 in one row of the mould member 2, which is in the so called filling position. The filled row of cavities then rotates to the so called discharge position. In the discharge position the formed products are discharged, preferably on a transportation belt. A movable unit 13 can be used to remove the drum from the food forming apparatus and transport it to a cleaning apparatus or storage unit.

The mould member 2 is in the present case a mould drum which rotates around an axis of rotation and can be provided with drive means, for example form-fit means at the drive side 11 of the forming apparatus. Preferably the mould member is also provided with a distributor to direct the flow of air to a certain row of cavities which are in the discharge position during production and/or a cleaning fluid during cleaning of the mould drum. Preferably, the mould member 2 comprises one fluid channel 15 per row of cavities, which is each delimited by the inner cylinder 16, two ribs 17 and the porous member 46. Bearing means to bear the drum can be provided at the drive side 11 and/or at the support side 12 of the forming apparatus.

The drum 2 preferably comprises an inner member 16, here a cylinder, and a multitude of ribs 17, which can be one piece with the inner member or can be connected, for example welded to the inner member. Preferably, two ribs delimit one row of cavities, which are filled from which the formed product is discharged simultaneously. The drum 2 furthermore comprises a porous member 46, which is preferably connected to the inner member. The mould cavities are provided in the porous member. The porous member is preferably sintered from metal- or plastic powder. The porous member can be one continuous, here cylindrical part, or can comprises a multitude of pieces, which are sintered between two ribs or inserted between two ribs 17 after the inserts have been sintered. Prior or after adhering the porous member(s) 46 to the inner member 16, the pores at the outer surface of the porous member(s) is at least partially closed to avoid that during discharge of the formed products, air leaks through the surface. The pores can, for example be closed by machining the surface of the porous member, for example deep rolling the surface.

Figure 2:
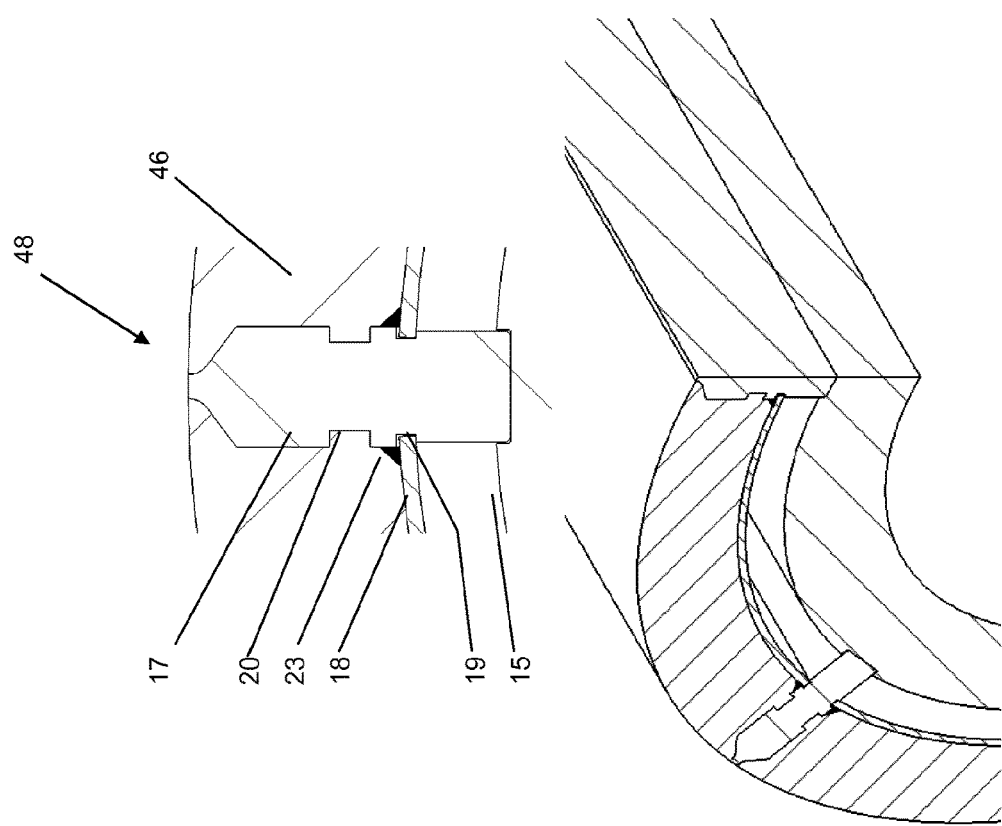
FIG. 2 shows a first embodiment of the inventive food forming drum.
Figure 2:
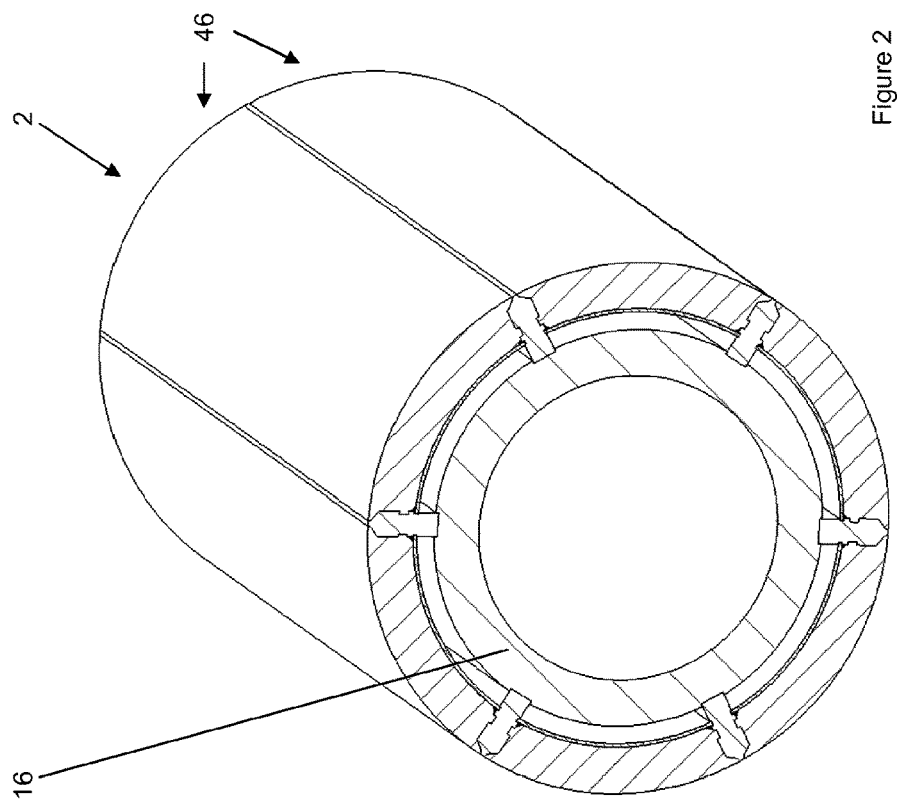

In the embodiment according to FIG. 2 each rib 17 extends, after the final machining step of the porous member, till the outer surface of the drum. After the drum is finished, preferably including the mounting of the end caps etc., the mould cavities 14, not depicted, will be provided, e.g. machined into the porous member. During discharge here no flow of fluid will occur between adjacent rows of cavities.

Figure 3B:
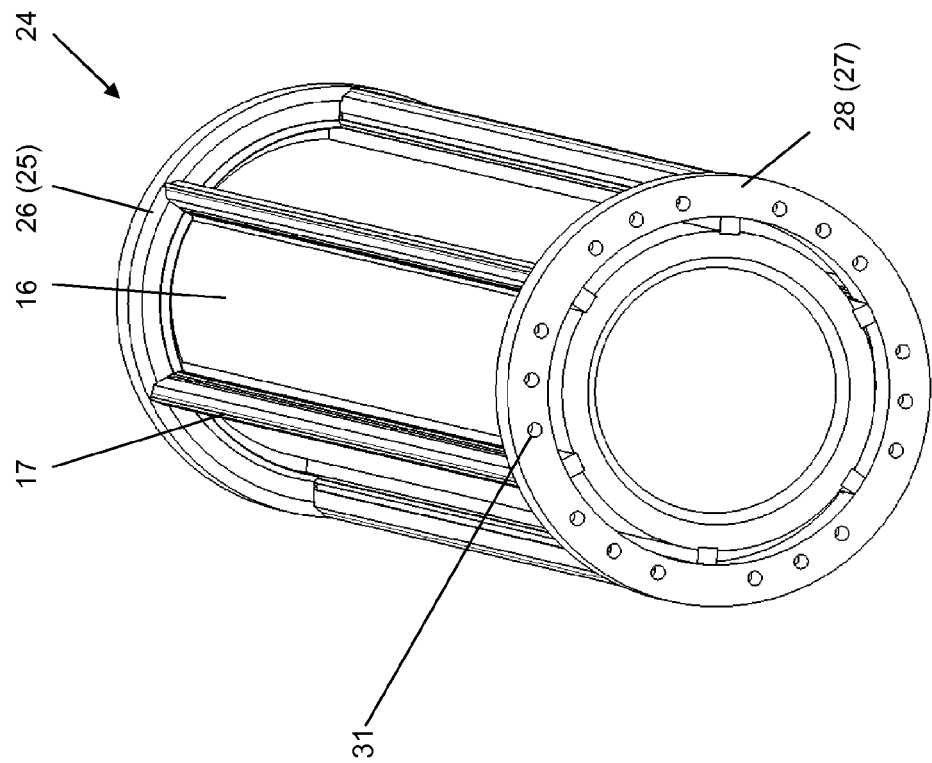
FIG. 3 shows an inner member of the food forming drum.
Figure 3A:
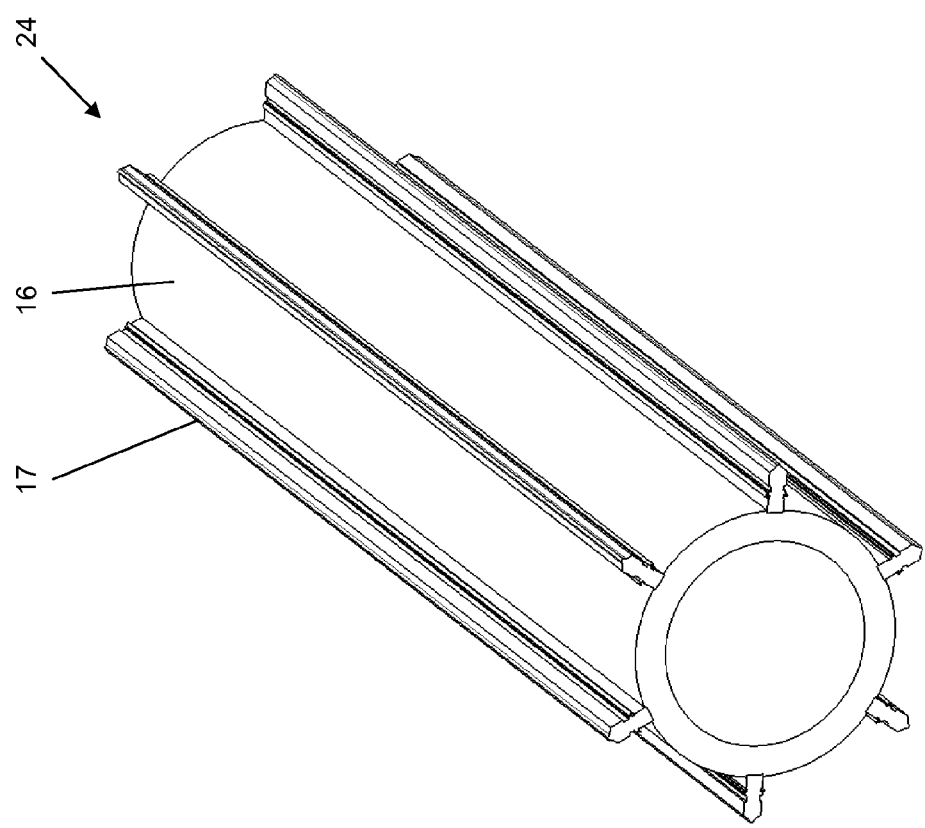

FIGS. 3a and 3b show two alternatives how the inner member 24 can be used during manufacturing the drum according to FIG. 2. In FIG. 3a the inner member 24 comprises an inner cylinder 16 and depending of the number of rows of cavities, here six, a plurality of ribs 17. In FIG. 3b the inner member 24 comprises optionally aside from inner cylinder 16 and ribs 17 also an end cap 26 at first front end 25 and/or an end cap 28 at second front end 27. Preferably the end cap(s) are provided with pre-machined recesses to secure the end cap(s) to the inner cylinder and/or the ribs, depending on the design of the drum 2. By welding the end caps to the inner cylinder and/or the ribs, the stiffness of the drum can be further increased. Filling the inner member with powder for the sintering process can be improved by providing one of the end caps, in FIG. 3b end cap 28, with filling holes 31. During pressing the forces will be directed to a defined chamber filled with powder which is, for example, advantageous for the adhesion of sinter powder to the ribs 17, a permeable support structure 18 and/or the surfaces of the connected end caps.

Figure 4:
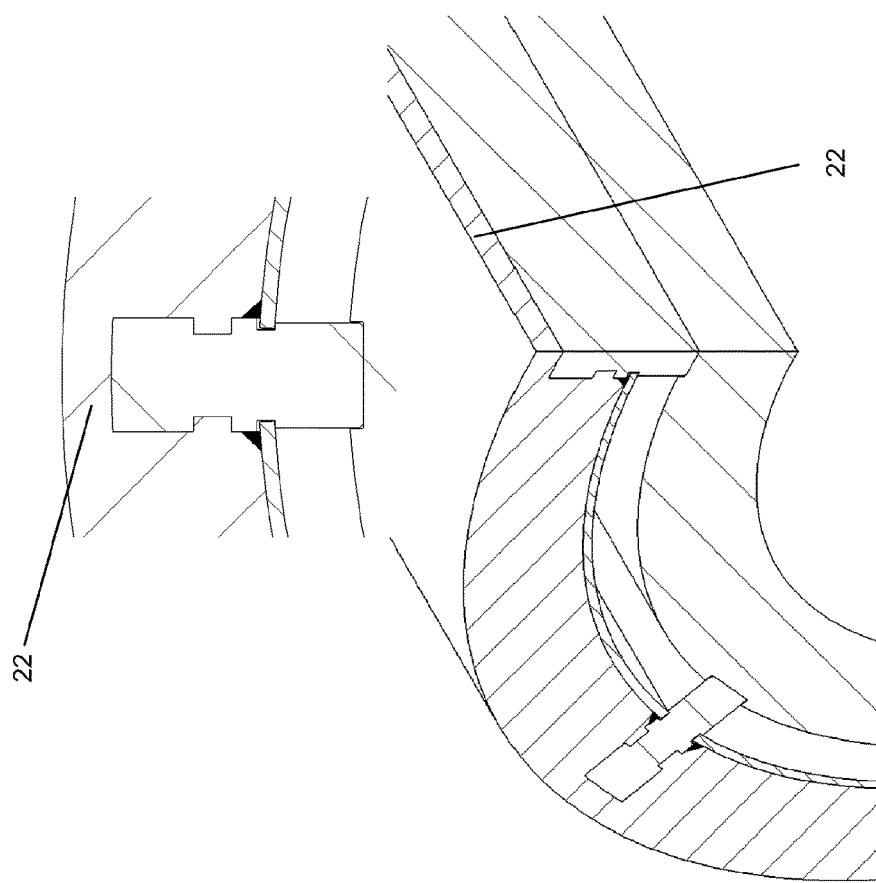
FIGS. 4-6 show each an embodiment of the food forming drum.
Figure 4:
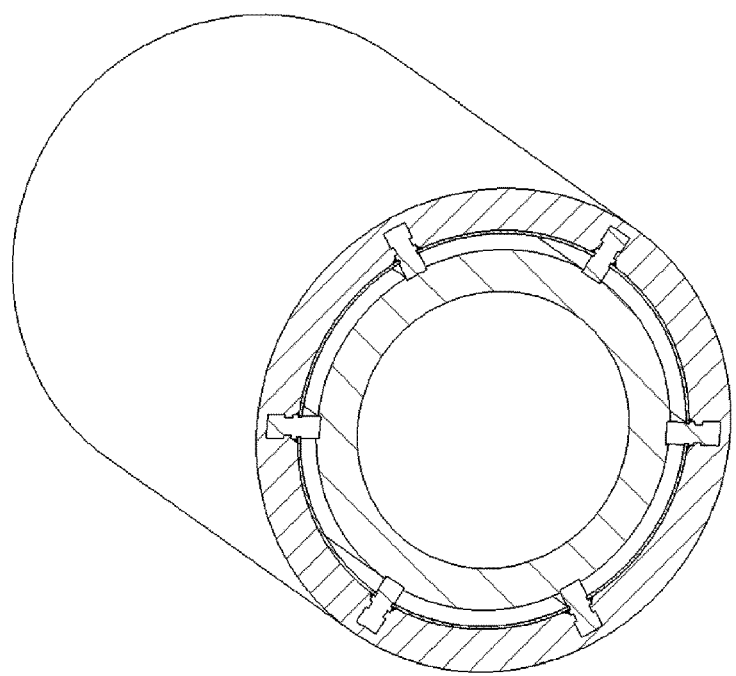

FIG. 4 shows a first embodiment of the inventive food forming drum, wherein an area 22 is provided, preferably between the tip 48 of the rib 17 and the, preferably closed, outer surface of the drum, in which the porous material extents in radial direction of the drum above the ribs. The area 22 preferably extends over the entire axial length of the ribs 17. During discharge of the products from the cavities, a fluid, e.g. air, is ejected, which forces the formed product out of the cavities. Some of this fluid flows via area 22 from one row to an adjacent row. The same can take place during cleaning of the drum.

Contrary to the embodiment according to FIG. 2 the porous member extends over the tip of the rib and preferably forms one continuous body. Unexpected tension peaks and/or breaking of the binding of the porous structure during the closing of the pores at the outer circumference of the drum, for example by a deep rolling process, can be prevented since the porous structure is not connected to a rib in the area 22. The dimension of area 22 should be chosen such that the outer surface can be machined, e.g. deep rolled, in a desired way and that the fluid from one row to another row preferably does not influence the process of forming food products, in particular not the discharge of products out of a specific row, e.g. the adhesion forces of formed products to the cavity walls in an adjacent row will not entirely be eliminated. However, a fluid flow from one row to an adjacent row via area 22 during discharge of the products in one row can also be desirable.

Figure 5A:
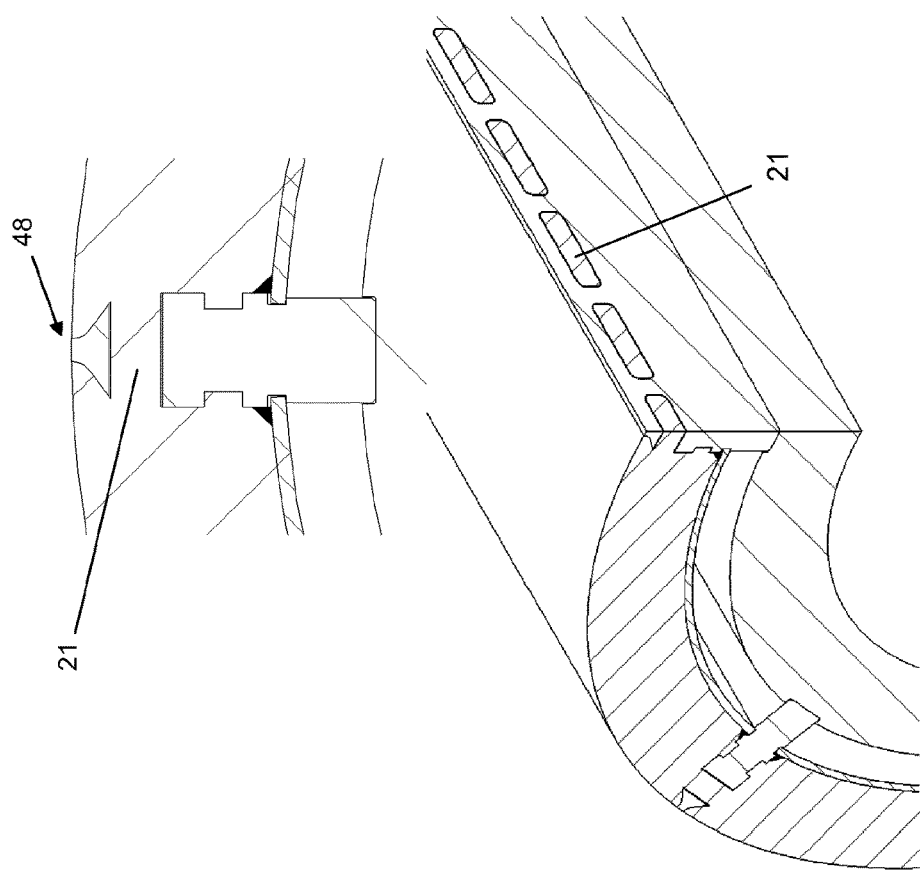
Figure 5A:
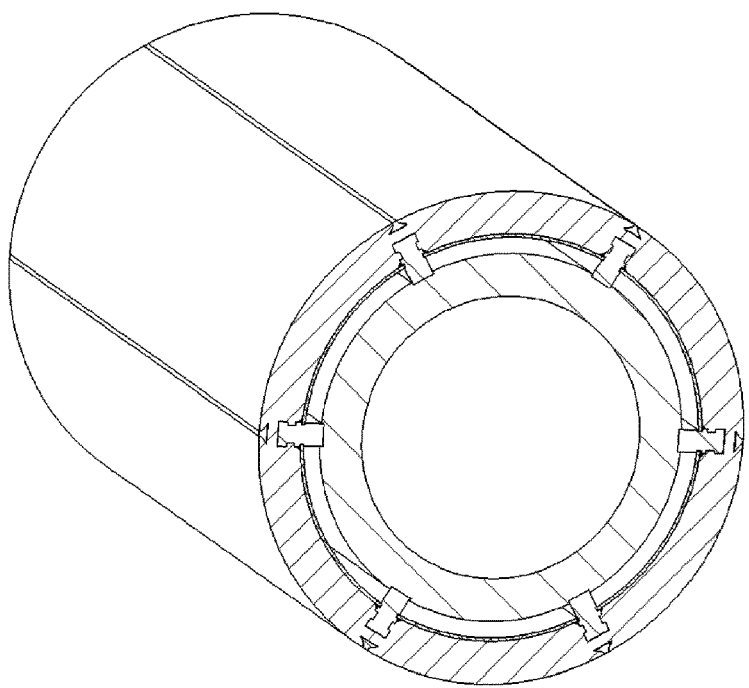

FIG. 5a shows a second embodiment of the inventive food forming drum. In the present case each rib 17 comprises at least one, preferably a multitude of recesses 21, which recesses extend all the way through the cross section of the rib and can at least partially be filled with sintering powder during the manufacturing process. The recesses in the ribs can, for example, be made in a cost efficient way by laser cutting or water jet cutting or the like. The ribs can extend till the outer surface of the drum. During discharge a fluid, for example air, flows between adjacent rows via the recesses 21 which are provided each rib 17.

The dimension and position of the recesses 21 in the rib should be chosen such that despite the recesses the rib is sufficient stiff to withstand the forces during pressing the porous powder. The recesses 21 are only provided locally and do not extend over the entire length of the rib. Preferably, a recess is provided between, preferably in the middle between two mould cavities.

Figure 5B:
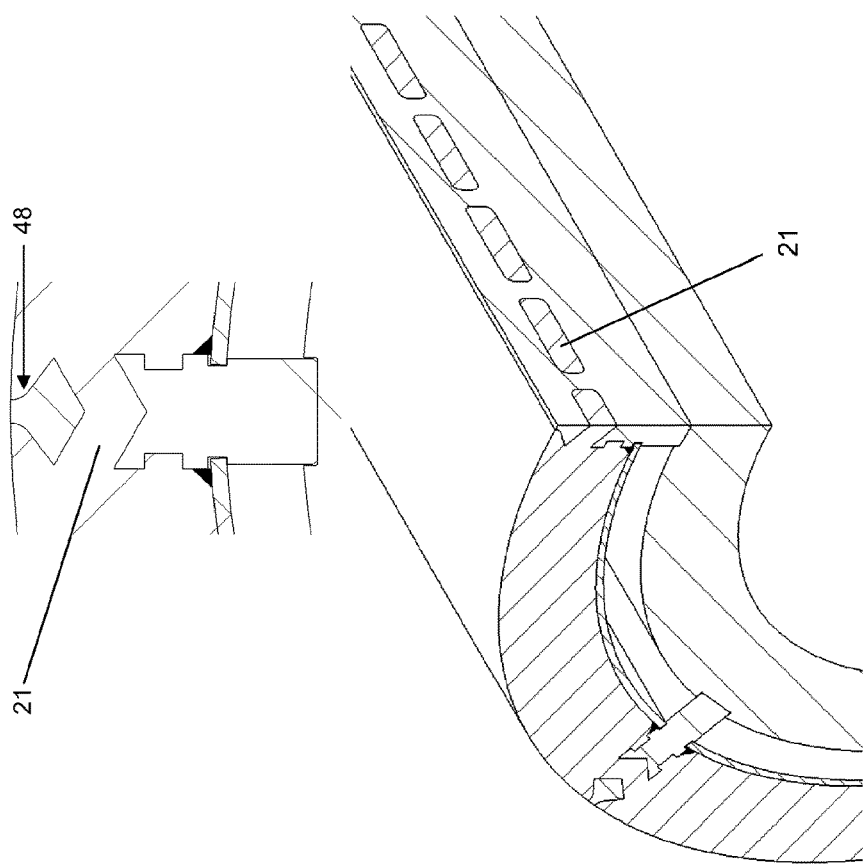
Figure 5B:
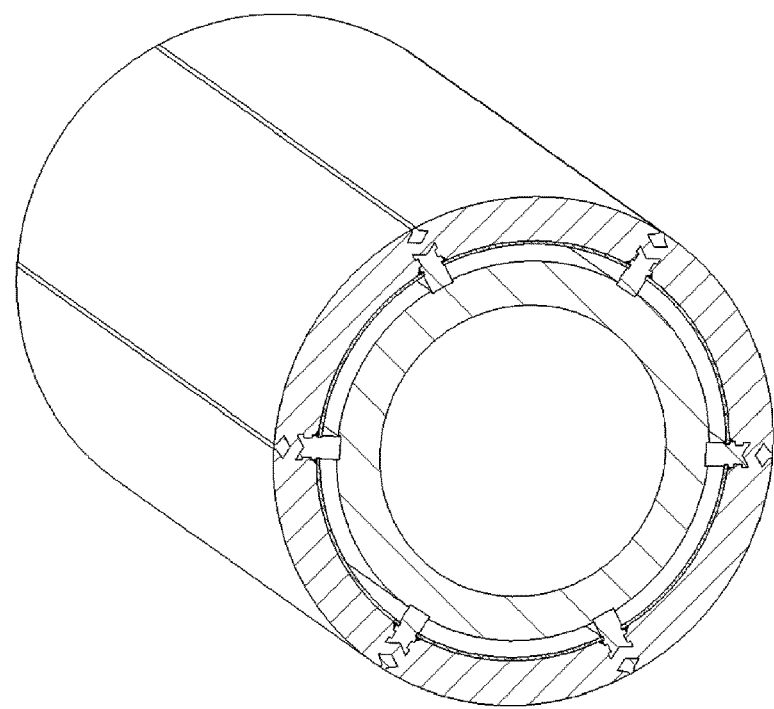

The cross section of the recesses 21 in FIG. 5b is different from the cross section of the recess in FIG. 5a. The shape of the cross section of the recess according to FIG. 5b is advantageous during the manufacturing process and especially during the pressing step because the forces will be directed such that sintering powder is forced into the, for example, V-shaped recess. The shape of the cross section of the recess according to FIG. 5b also guides the fluid flow, during discharge of a product, between two adjacent rows of cavities in a direction towards the outer circumference of the porous member, hence reducing its influence on the adhesion between cavity walls and the already formed products in an adjacent row upstream from the row in the discharge position.

Figure 6A:
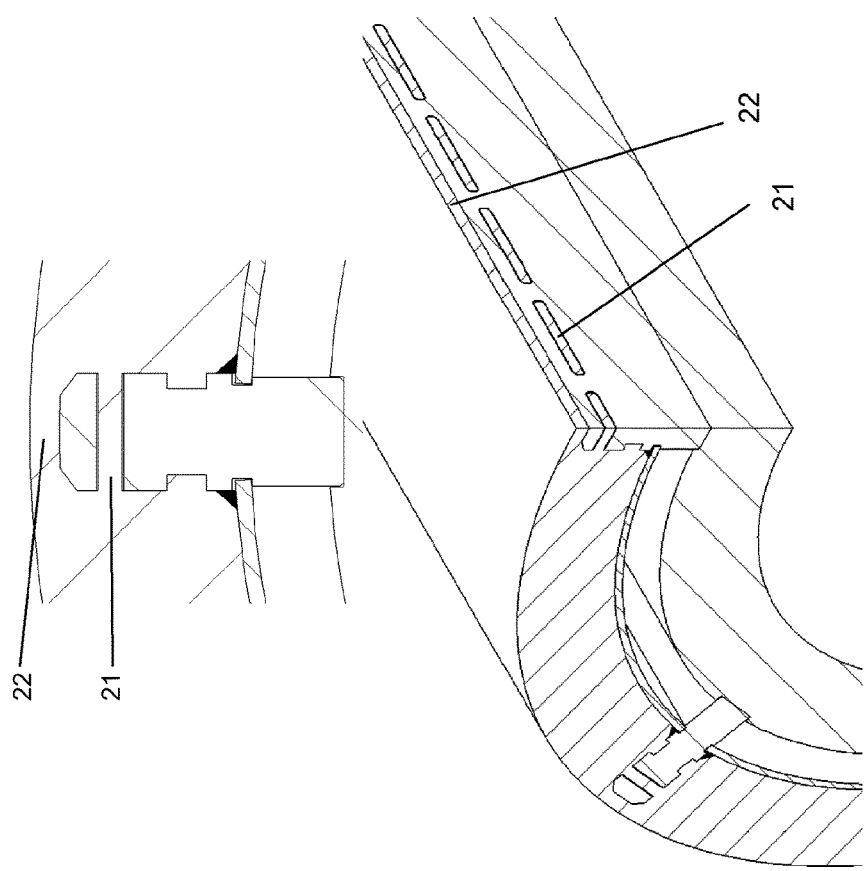
Figure 6A:
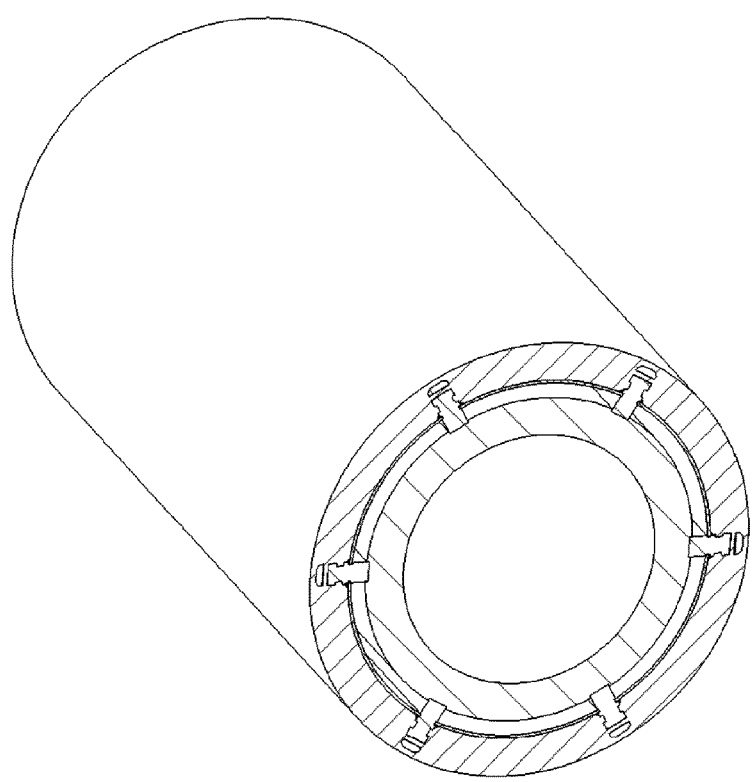

FIG. 6a shows a third embodiment of the inventive food forming drum. This embodiment is, in principal, a combination of the embodiments in FIG. 4 and FIG. 5. Fluid is, during discharge, allowed to flow partially via gap 22 between the tip of the rib and the outer surface of the drum, i.e. the porous member, and partially through recesses 21 in rib 17. The ratio of flow between gap 22 and recess 21 can be chosen such that the outer surface of the drum can be deep rolled in a desired way and/or that the fluid flow from one row to another row will not influence the process of forming food products. The recess 21 can be designed such that it guides a fluid flow towards the outer circumference of the porous member as depicted in FIG. 5b.

Figure 6B:
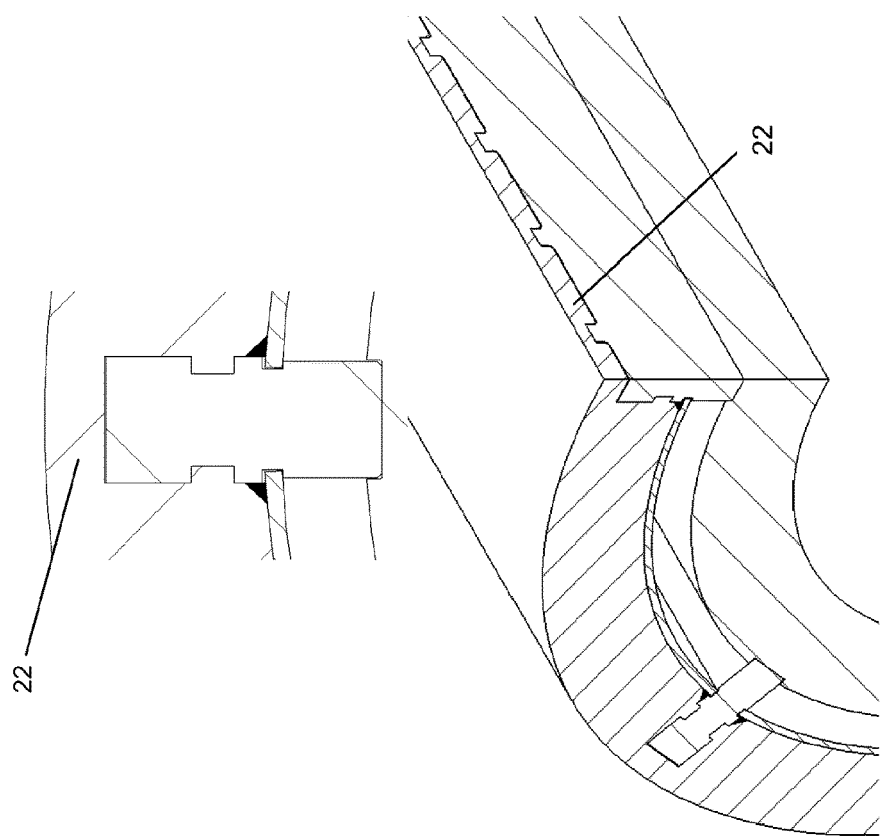
Figure 6B:
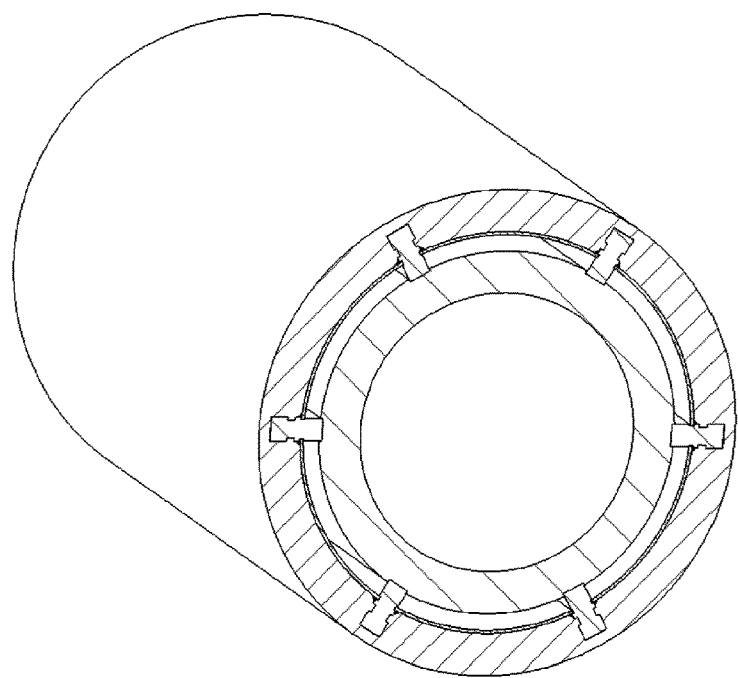

FIG. 6b shows an alternative of the embodiment according to FIG. 6a. The rib 17 in this preferred embodiment can be made more cost efficient. Further advantage is that the porous structure is locked in longitudinal direction of the drum by the created recesses and that the direction of forces during pressing of the porous powder is such that the powder is forced against the topside of the entire rib.

Figure 7A:
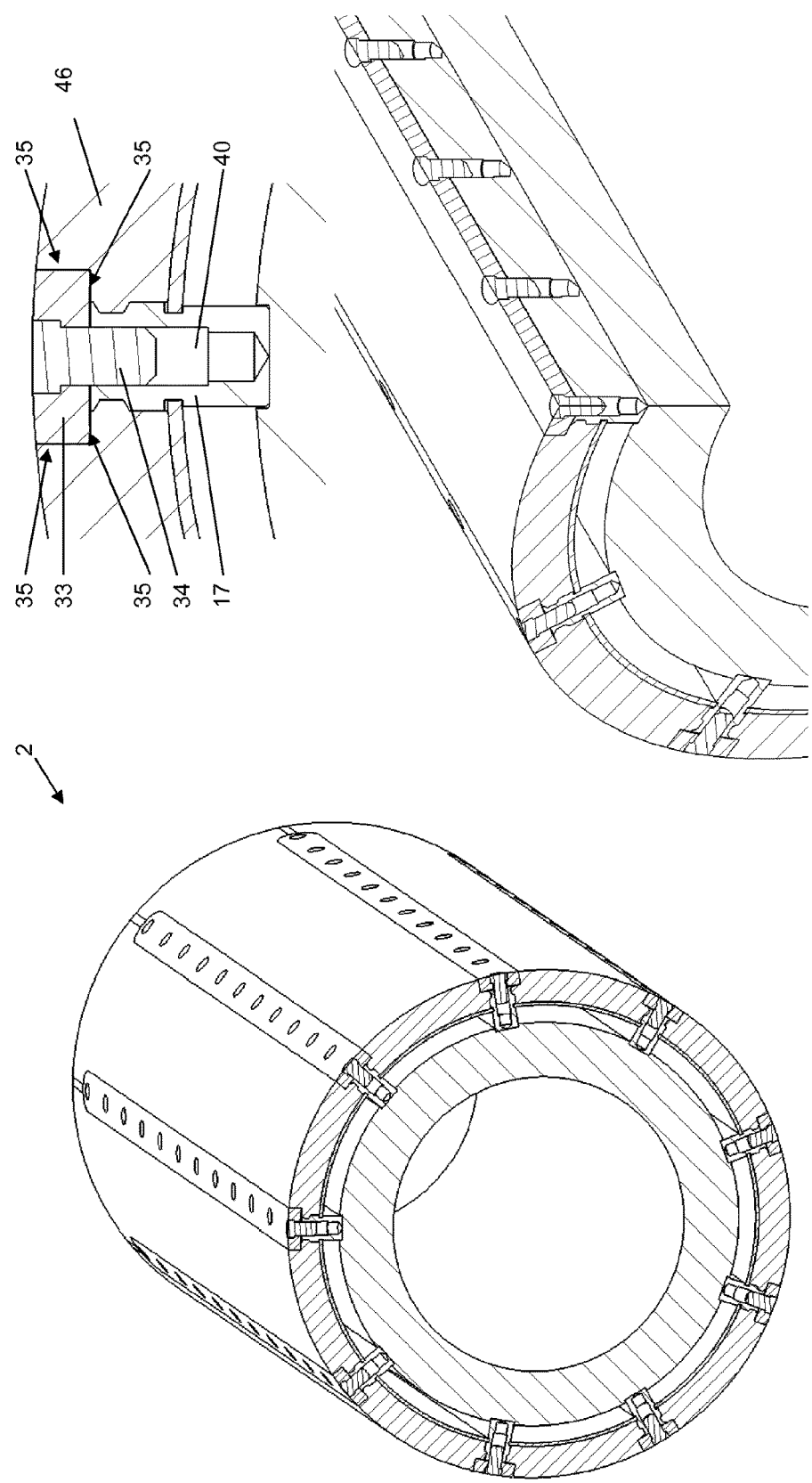
FIGS. 7-12 show the fixation of the porous member to the inner member.

In the embodiment according to FIG. 7a fastening means 33, here a retaining strip 33, is used to secure the porous member to the rib 17 and/or the inner cylinder, which is in the present case preferably an entire cylinder made from porous material. Especially in a drum design where the connection between the porous member and the rib relative to the existing forces during production and cleaning is not optimal, the porous structure can be connected to the rib by the retaining strip 33. This strip is depicted as a strip with a rectangular cross section, but is not limited to this shape. This embodiment will preferably be applied in a drum with a relatively small height, i.e. its extension in the radial direction, of the porous member 46. Reference sign 35 indicates the contact surfaces between the porous member 46, the rib 17 and the fastening means. In this contact area, preferably a sealing agent is used, at least locally, to prevent leakage of fluid from one row to an adjacent row during discharge of the formed products and/or to avoid hygiene-problems. This sealing agent can even be used in contact surfaces not referred to with reference signs 35. The agent can be in liquid form but a gasket can also be feasible. This sealing agent will in a more preferred embodiment be a combination of a sealing agent and a bonding agent.

In a first embodiment of manufacturing the drum ribs 17 will preferably extend beyond the final diameter of drum 2. Porous material will be applied between the ribs. After pressing, sintering and machining the outer circumference the pores at the outer surface will be closed. In another preferred manufacturing method the ribs will preferably extend below the final diameter of the drum. Porous material will be applied beyond the ribs such that an uninterrupted layer of porous material extends above the ribs. After pressing and sintering the pores at the outer surface of the drum will be closed.

Figure 7B:
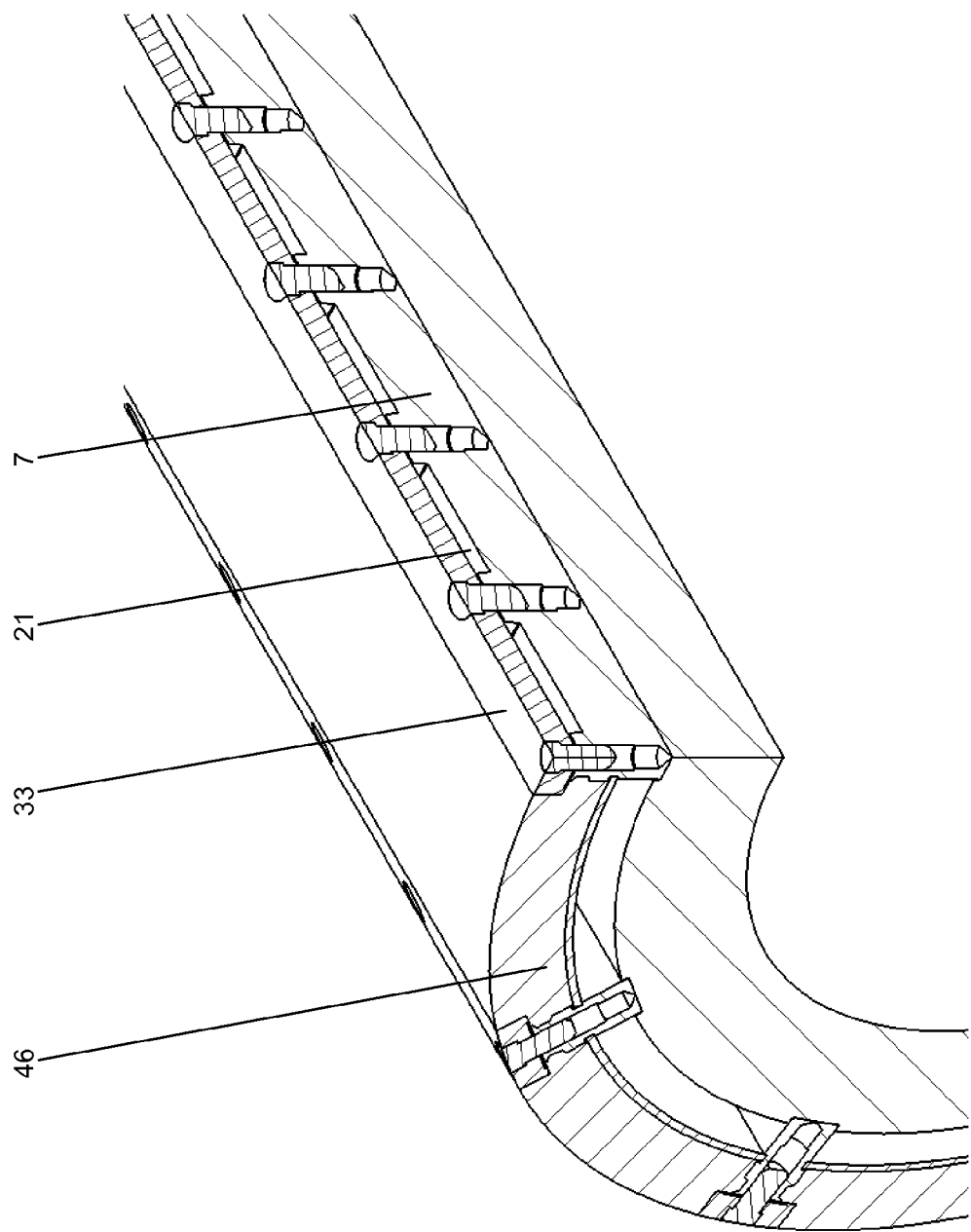

FIG. 7b shows an embodiment wherein rib 7 is provided with one or more recesses 21. This allows a fluid flow, for example a gas- or cleaning fluid flow between adjacent rows of cavities. Additionally and/or alternatively, one or more recesses can be provided in the retaining strip 33.

Figure 8B:
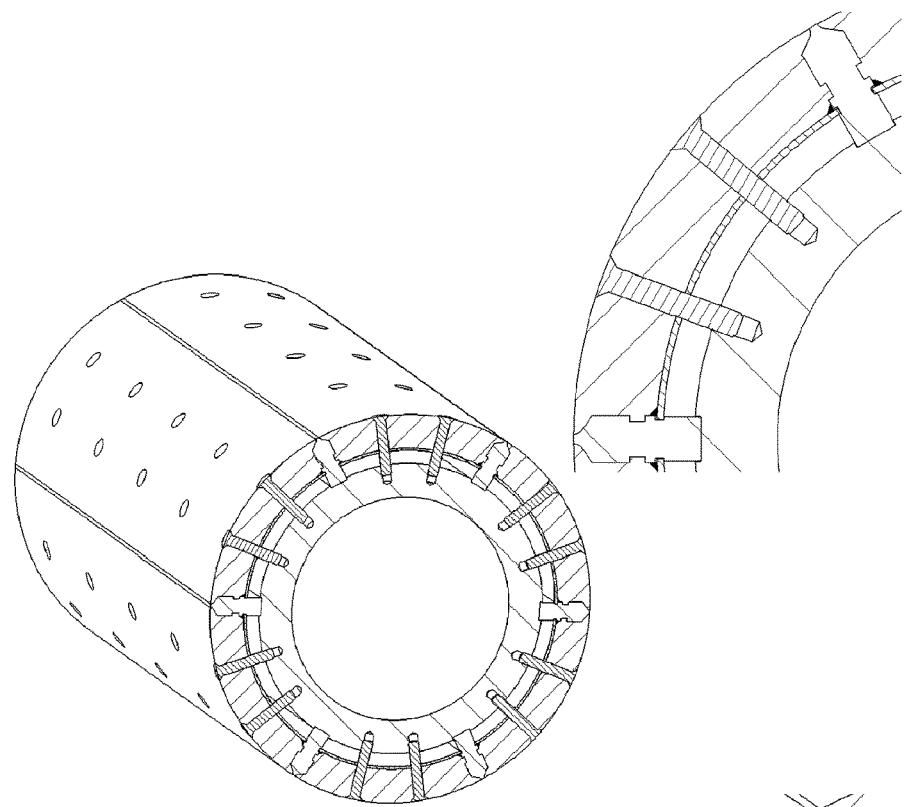
Figure 8A:
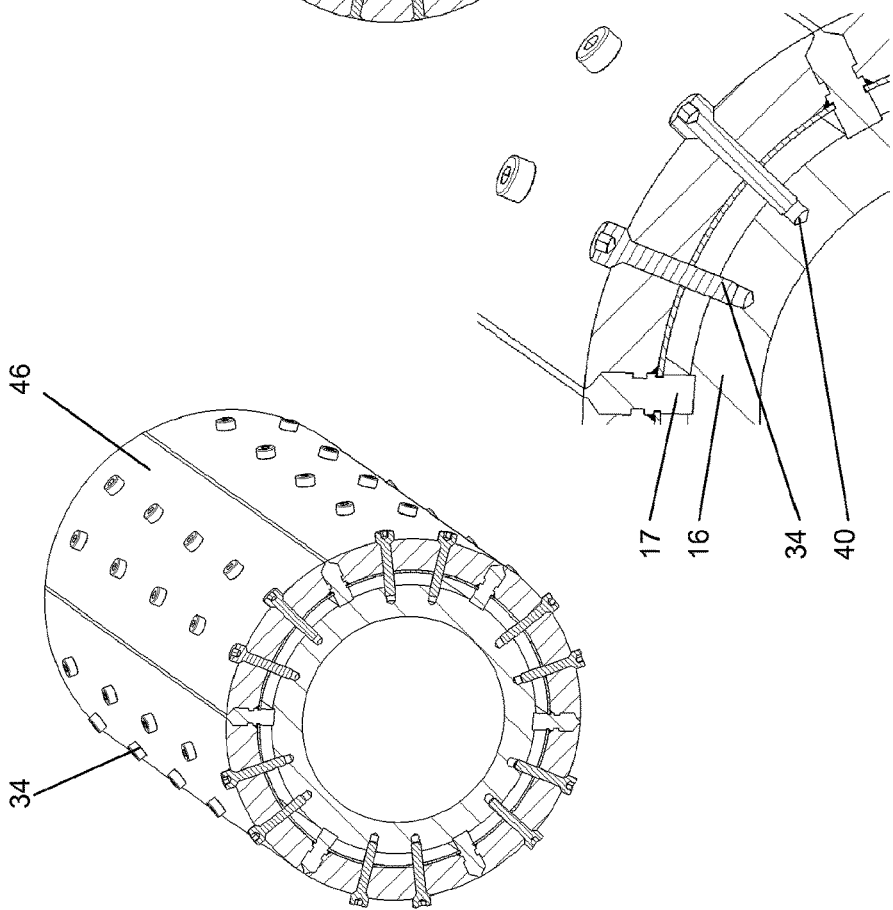

FIGS. 8a and b shows an embodiment where the porous member 46, which is preferably an entire cylinder, will be secured to the rib and/or the inner cylinder 16 by tension means 34. In FIG. 8a cheese-head screws are provided with a chamfered region which will act as support surface against the porous structure is utilized as the tension means 34. However, other tension means can be used as well. In the porous member 46 recesses are provided, which accommodate the tension means 34 partially. In the vicinity of the outer surface of the porous member, these recesses are preferably chamfered similarly as the support surface of the cheese-head screws. Connection means 40, in this case threaded holes, are machined in the outer surface of the tube 16, which is part of inner member 24. The position and the number of tension means to be used will depend on the forces which will exert on the porous member during production and/or cleaning. FIG. 8b shows the drum after the outer surface of the drum is machined. The part of the tension means 34 which projects from the outer surface of the porous member is removed, resulting in a preferably plane outer surface of the drum, while the closed pores at the outer surface of the porous member remain closed.

In the above mentioned embodiments the porous structure is created by applying powder in a pre-formed chamber followed by pressing and sintering. However, the porous structure can also be created as pre-shaped inserts which will be irreversibly fixed to the inner member 16 and/or the rib 17.

Figure 9A:
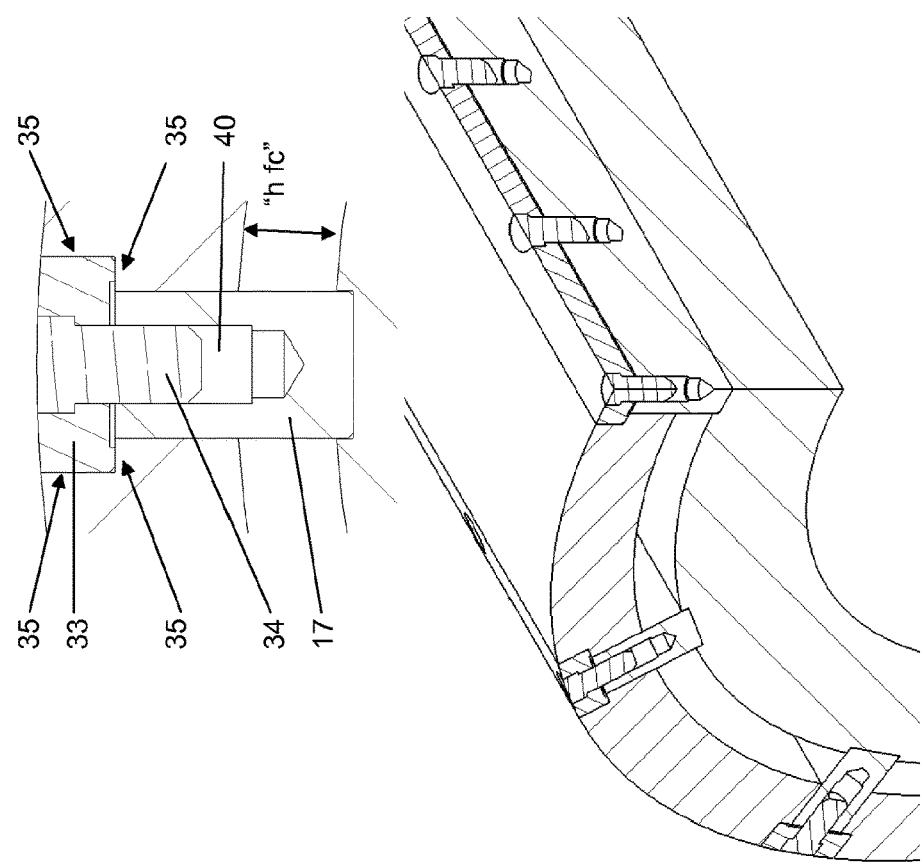
Figure 9A:
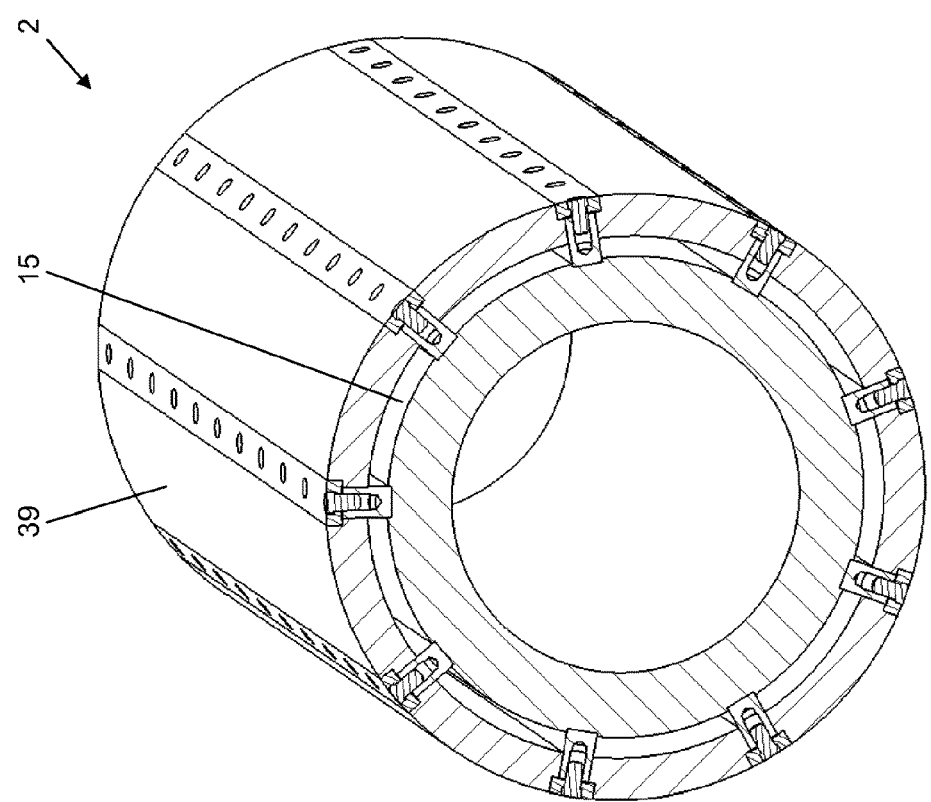

FIG. 9a shows a first embodiment of a the inventive food forming drum with porous inserts 39, which are separate segments each provided between two ribs 17. During production the forces exerted on the mass and the forces exerted on seal plate 10 will act on each porous insert 39 which is secured in its position by ribs 17. During cleaning, forces will exert in the fluid channel 15 and insert 39 will be secured in its position by retaining strips 33.

Figure 9C:
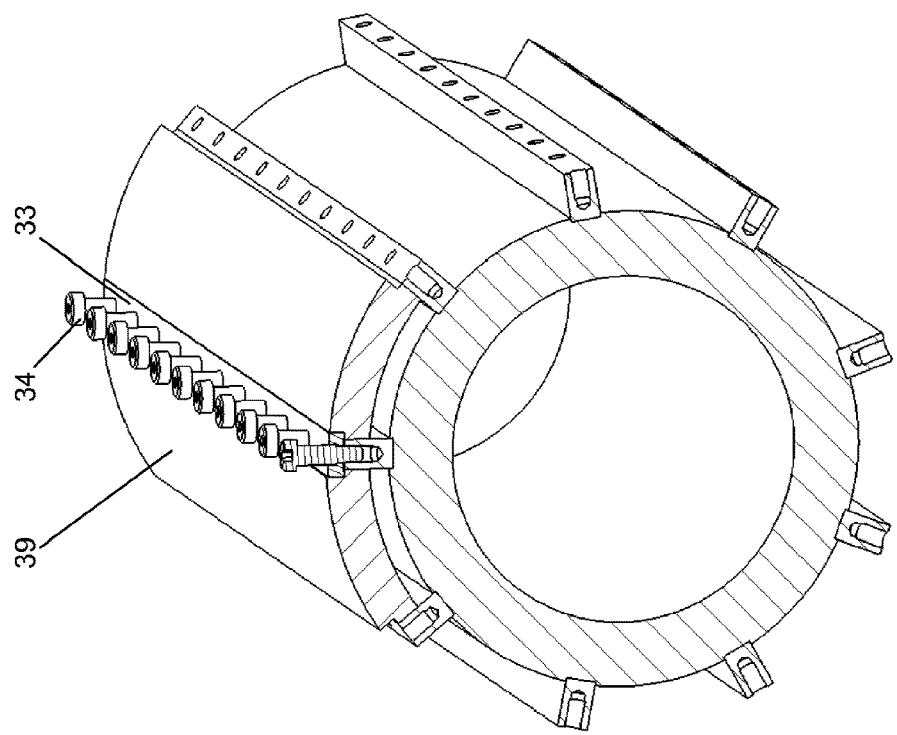
Figure 9C:
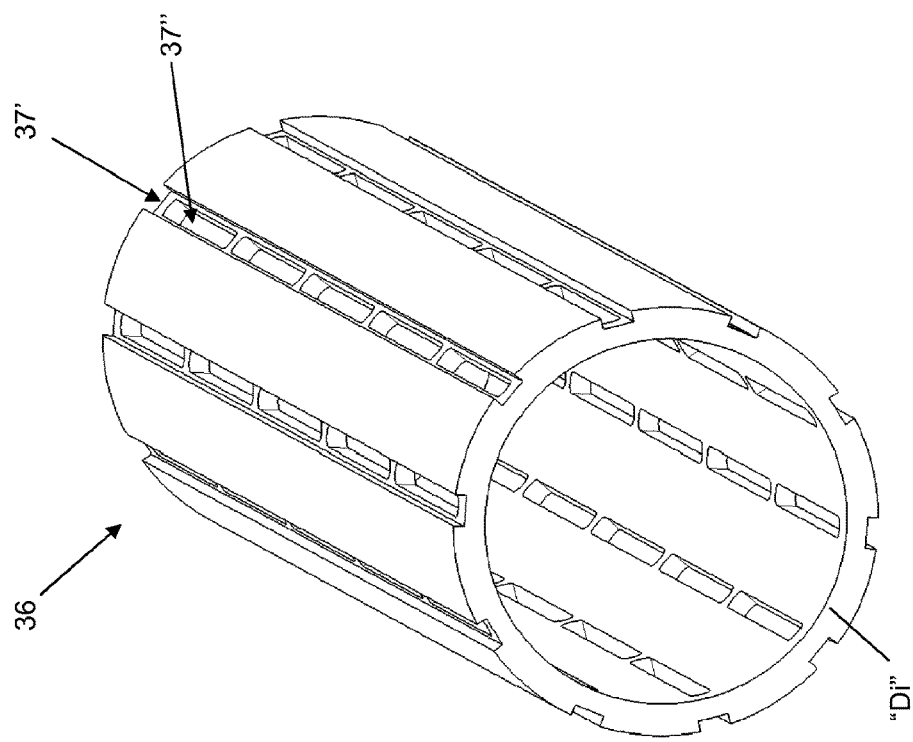

Feasible manufacturing steps for the embodiment of FIG. 9a is shown in FIG. 9b and FIG. 9c. FIG. 9b-I shows an inner member 24 wherein recesses 38 are provided by an inner cylinder 16 and a plurality of ribs 17 preferably welded at the inner cylinder 16. To assure that formed products in adjacent rows will all be discharged only at the discharge position with the same process parameters such as pressure, the height "hfc" of fluid channel 15 should be essentially the same for all rows. Hence, the positioning-accuracy of the ribs relative to the inner cylinder 16 is important. While the demanded accuracy cannot be achieved by welding, the ribs need to be machined after welding as shown in FIG. 9b-II.

The machining is shown in more in detail in FIG. 9b-III and indicated by the reference sign "mr". In the preferred solution, the drum 2 comprises end caps 26 and 28. These caps can be connected to the inner member by welding or preferably by bolting, before or after the inserts will be positioned in recesses 38. Annular sealing means are preferably provided to prevent leakage of fluid via the end cap connection. Connection means 40 can be provided, preferably before, or after positioning retaining strip 33.

Inserts 39 can be made in a pre-shaped mould or can be made out of a porous tube 36 as shown in FIG. 9c. Here, the inserts are made from an entire cylinder. Preferably first the outer surface of this cylinder will be machined, for example on a lathe and/or a grinder and concentric with an inner diameter "Di" which is slightly larger than the final diameter of the drum, preferably followed by closing the pores opening out at the outer surface of the porous tube. This assures a uniform closed layer over the entire surface as a result of the lack of a rib extending to the outer surface. In order to achieve for every single row an essentially same height "hfc" of fluid channel 15, inner diameter "Di" of porous tube 36 should be made according the desired roundness and cylindricity of the resulting drum 2.

For all embodiments described in this document the machining and/or deep rolling of the porous member is preferably carried out without the use of cooling and/or lubrication liquids in order to prevent the penetration of these liquids into the porous structure.

In a further step the tube will be segmented. This can be done in several ways. A preferred way is to provide firstly a recess 37' and then a recess 37" in the porous tube. The drum is yet still stiff enough to remain in its shape. In a next step the existing bridges between recesses 37" are removed in the longitudinal direction of the drum, for example by hand grinding which results in separated inserts 39. In case the inserts will not comply with the demanded accuracy with respect to height "h fc" of the fluid channel, the inserts need to be further machined. Before applying inserts 39 in the inner member 24, preferably sealing and/or bonding means will be used between the contact surfaces of the rib and the porous structure.

FIG. 9d-I show a first embodiment of a method to apply the inserts irreversibly fixed within the inner member 24. Two inserts 39 are applied in two adjacent recesses 38 and will be secured to the inner ember by a retaining strip 33 and tension means 34 which are provided between the inserts. After the first retaining strip is pre-stressed by tension means another insert will be applied and a second retaining strip with tension means will be added. This process continuous till all inserts are secured. FIG. 9d-II shows a more preferred embodiment wherein a plurality of retaining strips will be used on either side of the inserts to assure more stability in the position of the inserts. In FIG. 9d-III all inserts are secured t at the inner member 24 and FIG. 9d-IV shows the drum after the outer surface including tension means 34 is entirely turned on a lathe and/or grinded. The heads of the fastening means, here screws, have been removed until they level with the outer surface of the porous member. Regarding the outer surface of the drum, only limited material will be removed to remain the closed outer layer.

Retaining strip 33 is preferably on its left hand and right hand side in contact with an insert 39, respectively, preferably over the entire length of the drum in order to prevent a gap in the outer surface of the porous member. In the methods described in FIG. 9d this connection is highly depending on the accuracy of the machined inner member 24, inserts 39 and retaining strip 33. In the method described in FIG. 9e and FIG. 9f a preferred embodiment is shown wherein the porous tube 36 can be provided with a smaller recess 37' as can be seen by a comparison of FIG. 9e with FIG. 9c. This results in separated inserts 39 which are slightly different in shape than the inserts according to FIG. 9c.

Figure 9G:
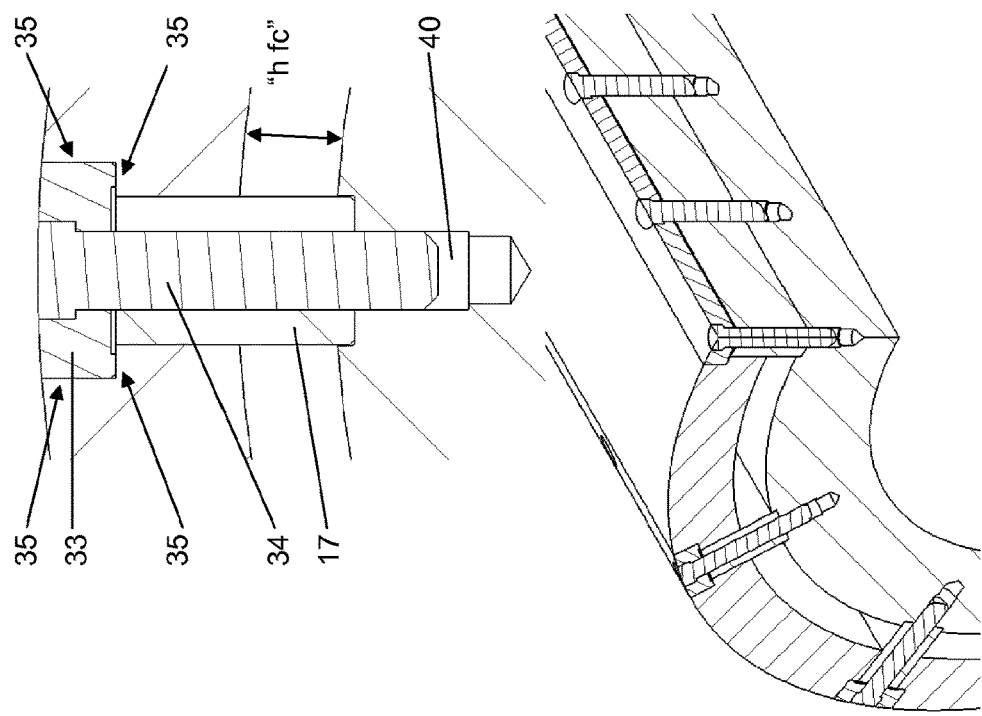
Figure 9G:
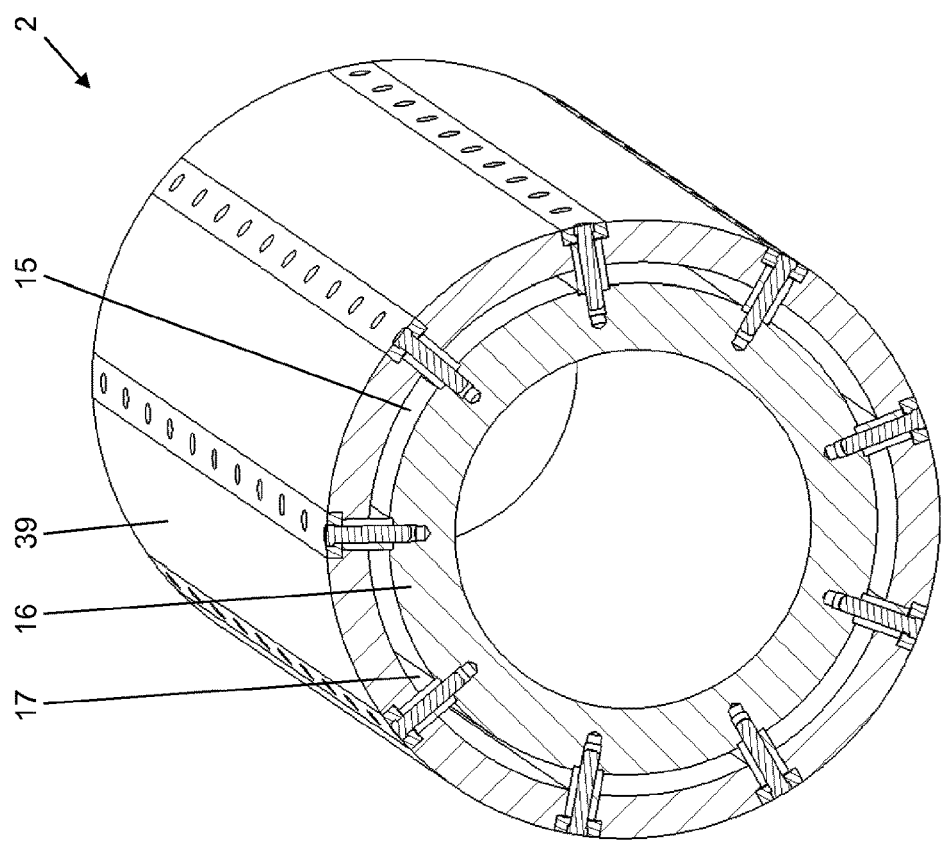

FIG. 9f shows an example of a method how to mill recess 41 into the inserts after the inserts are already positioned on the inner member 24 and without removing the inserts out of their initial position due to the cutting forces. FIG. 9f-I shows that first tooling which consists of positioning element 44 and a plurality of pressure blocks 43 which will be placed at the position intended for a retaining strip 33. Temporary retaining strips 45 will be used at either side of the inserts. By pre-stressing the pressure blocks and temporary retaining strips the inserts will be forced against their adjacent ribs. In FIG. 9f-II shows the machining here the milling of a recess 41 into an insert in the direction of the arrow. Therefore the first pressure block in the direction of the arrow has to be removed. The number of pressure blocks to be used depends on whether during machined inserts 39 remain in their position. This method assures a desired width of recess 37' over the entire length of the drum. In the embodiment of FIG. 9g rib 17 is connected with bolts against inner cylinder 16.

Figure 10A:
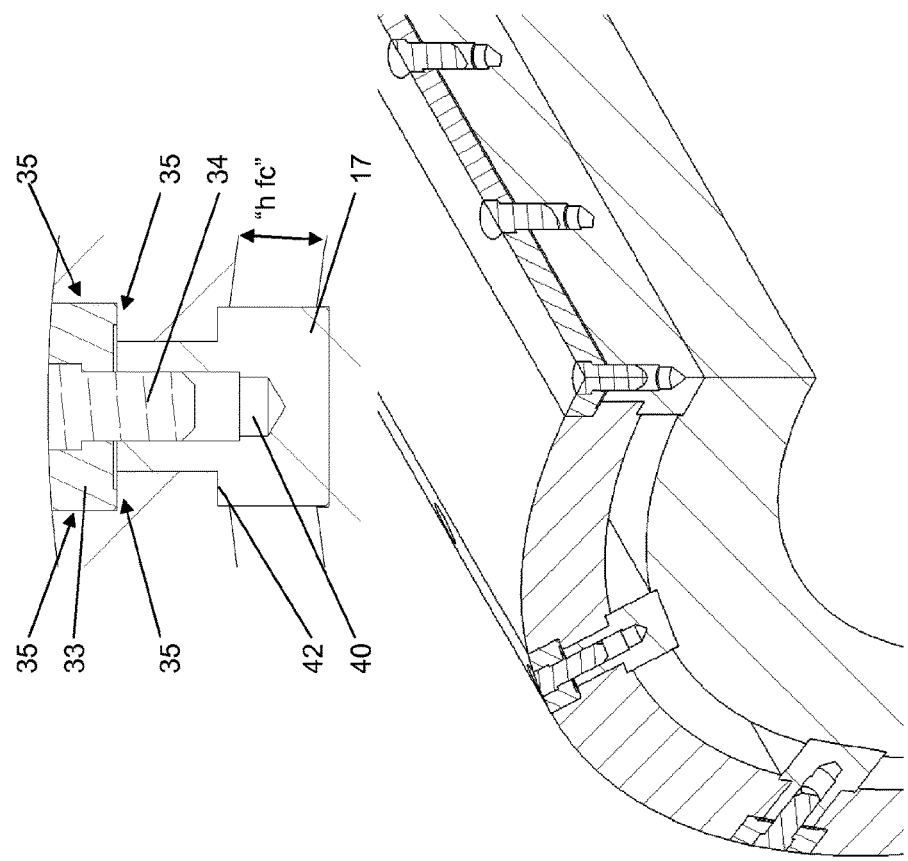
Figure 10A:
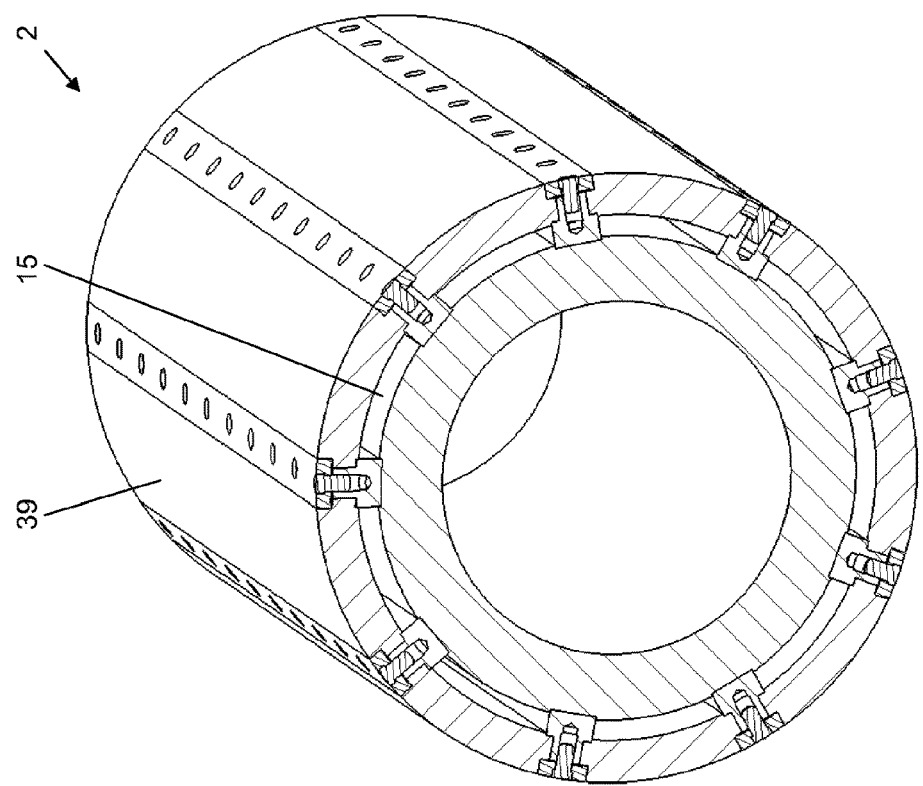

In the embodiment according to FIG. 9 the inserts 39 are with regard to the acting forces during production secured in their position with respect to the ribs by means of the geometrical shape of each insert. This demands a high accuracy of the machined recess 38 and the outer dimension of inserts 39. To reduce this dependency of machining accuracy, rib 17 in FIG. 10a is provided with a shoulder 42 to support the insert 39. Sealing and/or bonding means can be used at the contact surfaces 35 but preferably also at other contact surfaces of insert 39 with rib 17.

The dependency of machining accuracy can further be reduced by machining a recess within the inner surface of a porous insert such that a support surface is created. FIG. 10a shows this embodiment in which the support surface of insert 39 is in contact with shoulder 42. The highest dimensional accuracy can be achieved by preferably machining the recesses of an inserts in one setup.

Figure 11:
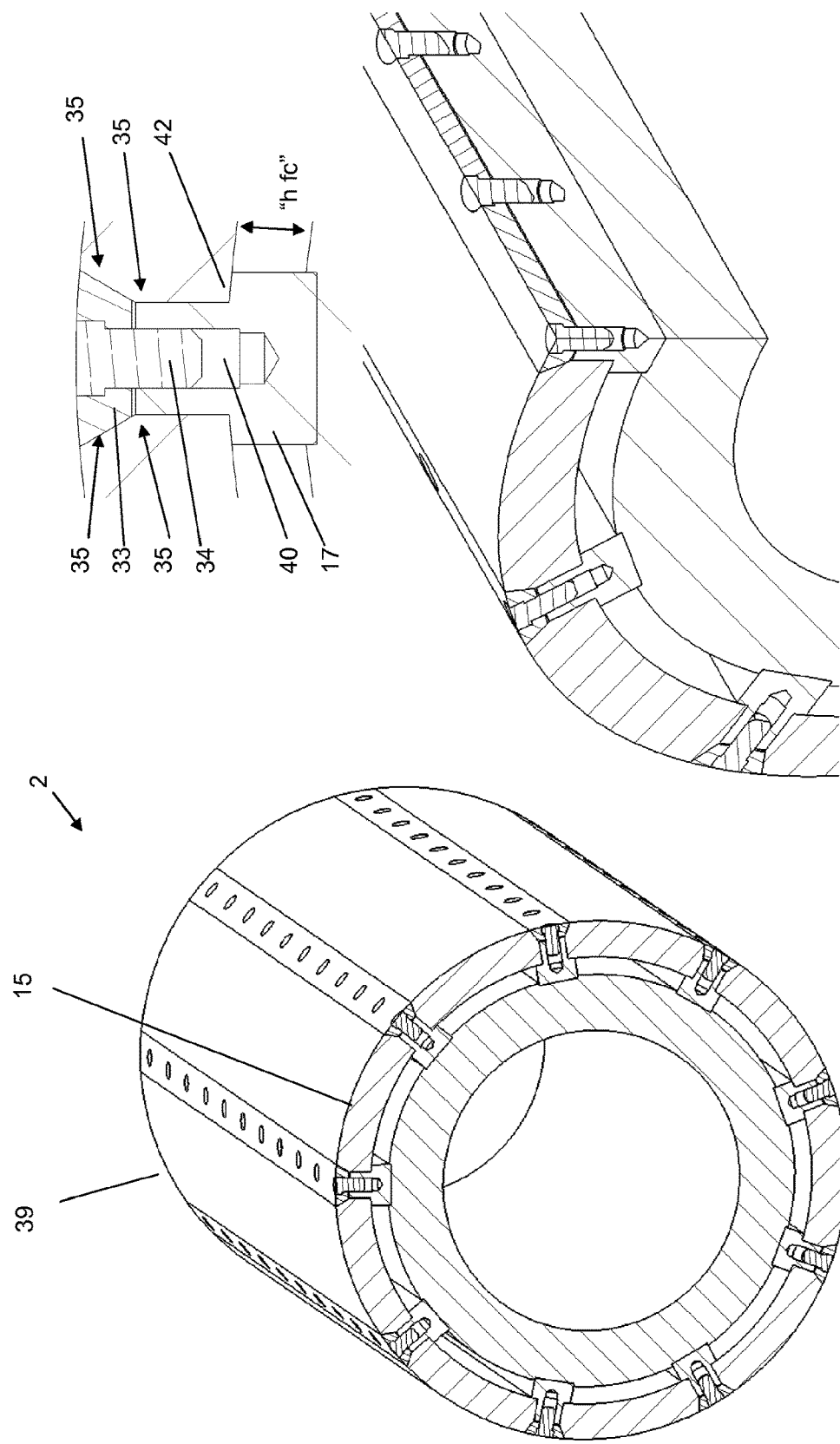

A larger clearance between retaining strip 33 and rib 17 in comparison to the embodiment according to FIG. 10a is shown in FIG. 10b. The used sealing agent at sealing point 35 can in this case be a strip made of a food approved material for example out of plastic or silicone. Preferably this strip has a certain degree of flexibility to be able to compensate the clearance during production FIG. 11 shows an embodiment wherein the dependence of machine accuracy is further reduced by using retaining strip 33 with sloped sidewalls. In the present case the cross section of the retaining strip 33 is trapeze-shaped. However it can, for example, also be V-shaped. Hence, inserts 39 can be machined within a larger tolerance range compared to the previous embodiments which reduces the risk of rejection of produced inserts. A further advantage is that when the retaining strip 33 is pre-stress against the insert 39 a seamless mechanical seal will be created which will prevent leakage of fluid alongside the rib and retaining strip to the ambient. Also preferably sealing and/or bonding means will be used between the contact surfaces of the rib and retaining strip with insert 39 but preferably also at other contact surfaces between the insert 39 and the rib 17. The outer surface of the retaining strip can be leveled to the outer surface of the porous inserts, if needed.

Figure 12B:
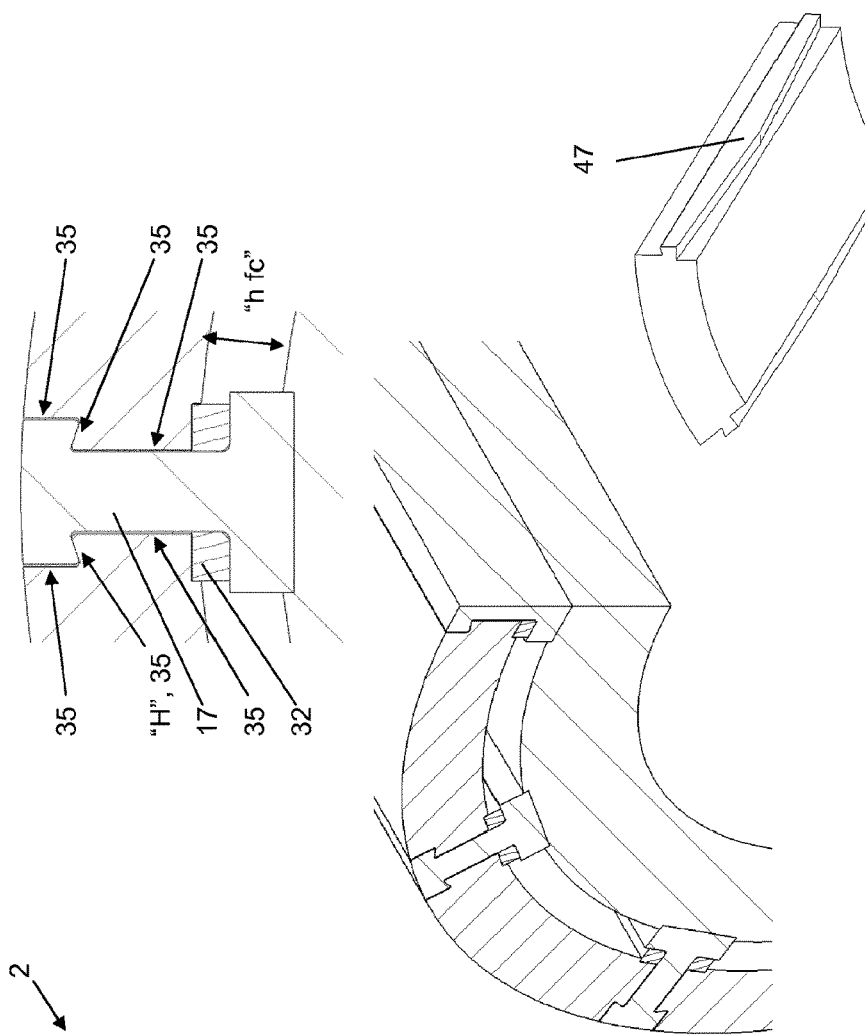
Figure 12A:
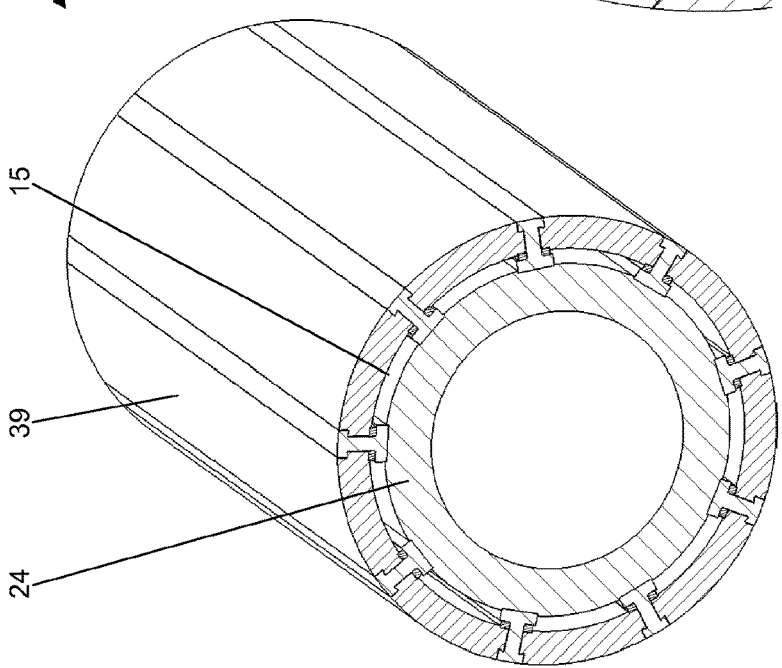

The embodiment of FIG. 12 shows a different approach to manufacture a drum with irreversibly fixed inserts. The inner member 24 comprises of ribs 17 connected to the tube 16. In a next step ribs 17 will be shaped according to the method described in connection with FIG. 12a. If inserts 39 will be manufactured out of a porous tube 36, depending on the feasibility regarding machine accuracy, the pores at the outer surface will be closed before dividing the tube into separate inserts. In a next step inserts 39 will be shaped according the embodiment shown in FIG. 12. During assembling, insert 39 will be slid into inner member 24 between two ribs 17 and will be lifted thereafter by clamp elements 32 till the insert is fixedly secured against the rib at surface contact area "H". Depending on the length of the drum and to prevent high assembling forces, a plurality of chamfered clamp elements, preferably with a small angle of inclination and preferably with different heights can be used. Therefore the contact surface of insert 39 with clamp elements 32 will be similar chamfered as is depicted in FIG. 12b. Clamp elements 32 will preferably be introduced from both outer ends of the drum, first the lowest clamp elements followed by one or more higher one(s). Also preferably sealing and/or bonding means will be used between the contact surfaces of the rib and retaining strip with insert 39 and preferably also between the clamp elements and its counter surfaces.

According to another preferred or inventive embodiment of the production method, the mould member 2 is partly or entirely made by 3D printing. Depending on the material and dimensions to be printed, it can be chosen which print technology will be used, for example FDM, SLA, SLS, etc.

According to a first preferred embodiment the entire mould member including fluid channels 15, porous structure 39 and a closed outer layer is made by printing, preferably food approved plastic or stainless steel, resulting in a single piece mould member. Depending on the finishing result, further machining will be necessary.

Figure 10:
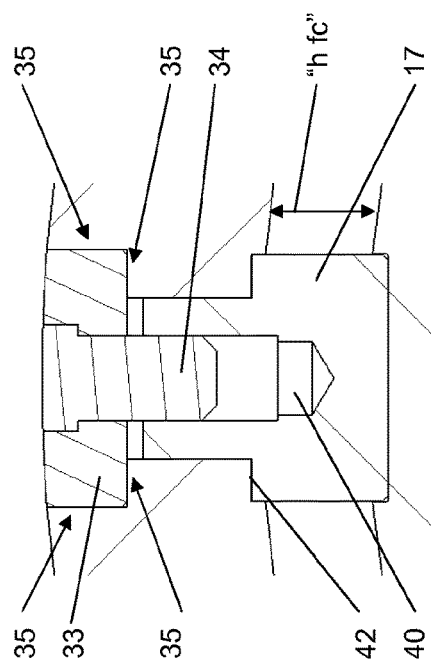
Figure 10:
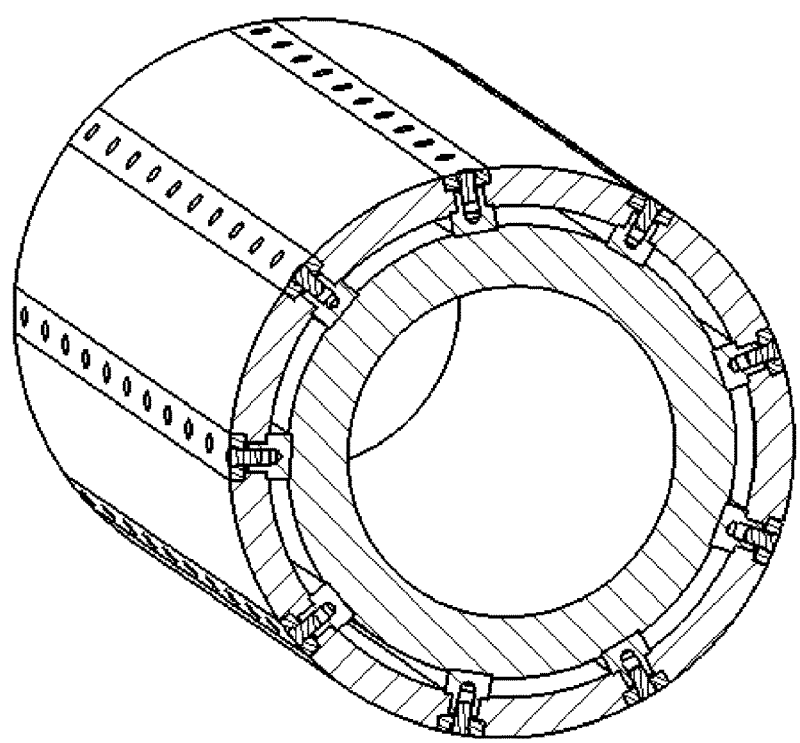

According to a second preferred embodiment, a separate base structure with recesses e.g. inner cylinder and ribs and/or separate inserts will be used and the base structure and/or the inserts are made out of plastic or stainless steel by printing. The base structure and inserts can be partly (deposit metal on an existing structure) or entirely printed or made by other manufacturing ways as described in WO2012107236 or WO2014118368. In a following step the porous inserts will be connected to the base structure. The connection between the base structure and the inserts can be similar as for example in FIG. 10 and FIG. 11 or as one of the other methods described in WO 2012107236 or WO 2014118368. Instead of the use of separate inserts, a porous structure can directly be printed between the recesses of the base structure as described in WO2012107236 and shown in FIG. 28.

In case the final mould member is not sufficient stiff enough to withstand the forces during production and or cleaning, according to a third preferred embodiment a mould member can be created by hybridized 3D printing. A plastic main structure can be reinforced with metal part(s) or metal can directly be printed onto plastic. In another variant a metal main structure will be provided with plastic part(s) or plastic can directly be printed onto metal.

Disclaimer for all Embodiments:

The inventions are not limited to the shown embodiments. Variations of inventions will be possible for example variations specifically related to the position of mould cavities within the drum. Other combinations of tension means and/or connection means than described in this application are possible. In all described embodiments the porous structure can be applied to the drum before or after the end caps are connected. In all described embodiments the closed layer can be created by deep rolling but also by other technique, for example by spraying which is already depicted in WO 2012/107236.

LIST OF REFERENCE SIGNS 1 food product forming apparatus
2 mould member, mould drum, food forming drum
3 mass supply system
4 hopper
5 feed pump/pump system
6 mass transport means
7 divider
8 food feed member
9 feed channel
10 sealing means drum, seal plate
11 drive side forming apparatus
12 support side forming apparatus
13 movable unit
14 mould cavity
15 fluid channel
16 inner cylinder, tube
17 rib
18 permeable support structure
19 recess in rib 17 to accommodate wire mesh
20 recess in rib 17 to lock porous structure
21 recess in rib 17 to allow fluid flow
22 area/gap above rib 17 to allow fluid flow
23 weld to connect wire mesh against rib
24 inner member
25 first front end of the drum (left side)
26 end cap at front end 25
27 second front end of the drum (right side)
28 end cap at front end 27
29 outer member mold, outer circumference of the sinter press
30 mold
31 Filling hole
32 clamp element
33 fastening means, retaining strip
34 tension means
35 sealing location
36 porous tube
37 recess in porous tube
38 recess in drum to accommodate insert
39 (partially) porous insert, (partially) porous segment, (partially) porous member
40 connection means in inner member 24 to secure retaining strip 33
41 recess in drum to accommodate retaining strip 33
42 shoulder rib 17
43 tooling: pressure block
44 tooling: positioning element
45 tooling: temporary retaining strips
46 porous member
47 chamfered fixing means
48 tip of the rib
"Di" inner diameter porous tube 36
"H" surface contact area
"h fc" height fluid channel 15
"mr" machining rib 17

The invention claimed is:

1. A food forming drum comprising:
an inner member with an inner cylinder;
a multitude of ribs extending in a radial direction from the inner cylinder, at least one porous member connected to the ribs, the porous member is made from a porous material with interconnecting pores; and a multitude of rows of product cavities provided in the porous member, each of the rows comprising one or a multitude of product cavities, wherein the porous member extends radially above a radial extension of the ribs, wherein at least one of the ribs comprises at least one recess that is filled with a porous material.

2. The food forming drum according to claim 1, wherein a width of a cross section of each of the ribs is reduced at its tip.

3. The food forming drum according to claim 1, wherein a liquid flows through the recess during discharge of formed products and/or during cleaning.

4. The food forming drum according to claim 3, wherein the recess guides the liquid to and/or from an outer surface of the porous member.

5. The food forming drum according to claim 4, wherein the food forming drum comprises at least one end cap that comprises openings for filing the inner member with a sintering powder.

6. The food forming drum according to claim 1, wherein the recess is provided at a tip of each of the ribs.

7. The food forming drum according to claim 6, wherein the food forming drum comprises a means, the means is a strip that extends over an entire length of the food forming drum.

8. The food forming drum according to claim 7, wherein the strip has a cross section that includes at least one sloped sidewall.

9. The food forming drum according to claim 1, wherein the food forming drum comprises at least one end cap that is bonded or welded to the inner cylinder and/or to the ribs.

10. The food forming drum according to claim 1, wherein the food forming drum comprises a means to connect the porous member to the inner cylinder and/or to the ribs, and
wherein the means extends radially to an outer surface of the porous member.

11. The food forming drum according to claim 1, wherein the food forming drum comprises at least one clamping means that clamps the porous member against the ribs.

12. The food forming drum according to claim 1, wherein the porous member is an insert that is provided with a chamfered fixing means.

13. A method comprising: producing the food forming drum of claim 1, wherein the producing includes securing the porous member to the inner member by a means, wherein the means are subsequently partially cut off.

14. The method according to claim 13, wherein the method comprises:
machining and/or deep rolling the porous member without use of cooling and/or lubrication liquids.

15. The method according to claim 13, wherein the method comprises:
providing recesses in a porous tube before cutting the tube into segments.

16. The method according to claim 13, wherein the method comprises:
placing an insert between two of the ribs, and
securing the insert to the inner member by a retaining strip and a fastening means.

17. The method according to claim 13, wherein the method comprises' machining recesses into an insert after positioning the insert on the inner member.

18. The method according to claim 13, wherein the method comprises:
sliding inserts between two of the ribs, and then at least locally lifting the inserts until the inserts are in contact with a projection at the ribs.

19. The method according to claim 13, wherein the porous member is sintered, and
wherein the at least one recess is machined into the porous member, and
wherein a retaining strip is provided into the recess and fastened to the inner member the ribs of the food forming drum.

20. The method according to claim 13, wherein the method comprises:
clamping porous inserts between two of the ribs,
wherein the clamping step comprises clamping the porous inserts between two shoulders of the two ribs and securing the porous inserts to the ribs by a retaining strip.

21. The method according to claim 20, wherein a longitudinal seal is provided between the ribs, the porous inserts and/or the retaining strip, and
wherein the longitudinal seal is a sealing strip.

* * * * *